US011332872B2

(12) United States Patent
Yoneda et al.

(10) Patent No.: US 11,332,872 B2
(45) Date of Patent: May 17, 2022

(54) DRUM WASHING MACHINE

(71) Applicants: QINGDAO HAIER WASHING MACHINE CO., LTD., Shandong (CN); AQUA CO., LTD, Tokyo (JP)

(72) Inventors: Masanori Yoneda, Tokyo (JP); Harumi Takeuchi, Tokyo (JP)

(73) Assignees: QINGDAO HAIER WASHING MACHINE CO., LTD, Shandong (CN); AQUA CO., LTD, Tokyo (JP)

( * ) Notice: Subject to any disclaimer, the term of this patent is extended or adjusted under 35 U.S.C. 154(b) by 927 days.

(21) Appl. No.: 15/781,112

(22) PCT Filed: Dec. 1, 2016

(86) PCT No.: PCT/CN2016/108216
§ 371 (c)(1),
(2) Date: Jun. 1, 2018

(87) PCT Pub. No.: WO2017/092692
PCT Pub. Date: Jun. 8, 2017

(65) Prior Publication Data
US 2018/0347097 A1 Dec. 6, 2018

(30) Foreign Application Priority Data
Dec. 1, 2015 (JP) .............................. JP2015-234639

(51) Int. Cl.
*D06F 37/30* (2020.01)
*D06F 34/08* (2020.01)
(Continued)

(52) U.S. Cl.
CPC ............ *D06F 37/304* (2013.01); *D06F 34/08* (2020.02); *D06F 23/02* (2013.01); *D06F 23/06* (2013.01); *D06F 37/40* (2013.01)

(58) Field of Classification Search
CPC ...... D06F 37/306; D06F 37/304; D06F 37/40; D06F 37/30; D06F 23/02; D06F 23/06; D06F 17/08
(Continued)

(56) References Cited

U.S. PATENT DOCUMENTS 4,232,536 A * 11/1980 Koseki ..................... D06F 37/40
68/12.24
4,317,343 A * 3/1982 Gerry ....................... D06F 37/40
475/14
(Continued)

FOREIGN PATENT DOCUMENTS

CN 2576758 Y 10/2003
CN 201924194 U 8/2011
(Continued)

OTHER PUBLICATIONS

Chen et al., "Novel clutch for roller washing machine", Nov. 2015, CN-105063965-A—Machine Translation (Year: 2015).*
(Continued)

*Primary Examiner* — Michael E Barr
*Assistant Examiner* — Thomas Bucci
(74) *Attorney, Agent, or Firm* — Arentfox Schiff LLP

(57) ABSTRACT

Provided is a drum washing machine. The drum washing machine, which is provided with a rotating body on the rear a drum, is able to smoothly switch between a first form in which the drum and the rotating body rotate independently and a second form in which the drum and the rotating body rotate integrally. When switching from a biaxial driving form to a uniaxial driving form and vice versa, a control part rotates a rotor clockwise and anticlockwise in a manner of taking a reverse action 1 and a reverse action 2 during the operation of a torque motor, i.e., during an action of moving a clutch body by virtue of a moving mechanism. The reverse
(Continued)

action 1 includes an action of stopping the rotor rotating clockwise direction, and the reverse action 2 includes an action of stopping the rotor rotating anticlockwise.

3 Claims, 17 Drawing Sheets

(51) Int. Cl.
*D06F 23/06* (2006.01)
*D06F 23/02* (2006.01)
*D06F 37/40* (2006.01)

(58) Field of Classification Search
USPC ...... 68/12.01, 23.7, 133, 12.24, 12.02, 23.6, 68/131, 132
See application file for complete search history.

(56) References Cited

U.S. PATENT DOCUMENTS

| | | | | |
|---|---|---|---|---|
| 4,910,979 A * | 3/1990 | Burk | ........................ | D06F 37/40 68/133 |
| 4,969,341 A * | 11/1990 | Burk | ........................ | D06F 37/40 192/108 |
| 5,000,016 A * | 3/1991 | Burk | ........................ | D06F 37/40 68/23.7 |
| 5,209,085 A * | 5/1993 | Brien | ........................ | D06F 37/40 192/18 B |
| 5,269,160 A * | 12/1993 | Wood | ........................ | D06F 37/40 68/23.7 |
| 5,345,793 A * | 9/1994 | Sharp | ........................ | D06F 37/40 475/345 |
| 5,551,261 A * | 9/1996 | Lyu | ........................ | D06F 37/40 68/23.6 |
| 5,551,262 A * | 9/1996 | Seo | ........................ | D06F 37/40 192/84.3 |
| 5,586,455 A * | 12/1996 | Imai | ........................ | F16D 11/14 68/12.02 |
| 5,661,990 A * | 9/1997 | Chong | ........................ | D06F 37/40 68/23.6 |
| 5,680,778 A * | 10/1997 | Seo | ........................ | D06F 37/40 68/23.7 |
| 5,737,944 A * | 4/1998 | Nishimura | ........................ | D06F 37/40 68/23.7 |
| 5,778,703 A * | 7/1998 | Imai | ........................ | D06F 34/10 68/12.02 |
| 5,842,358 A * | 12/1998 | Koo | ........................ | F16D 11/14 68/23.7 |
| 5,860,299 A * | 1/1999 | Eum | ........................ | D06F 37/40 68/133 |
| 5,873,269 A * | 2/1999 | Hong | ........................ | D06F 37/304 68/23.7 |
| 5,884,507 A * | 3/1999 | Lee | ........................ | D06F 37/304 68/23.7 |
| 5,887,458 A * | 3/1999 | Bae | ........................ | D06F 17/06 68/23.7 |
| 6,148,646 A * | 11/2000 | Koshiga | ........................ | D06F 37/40 68/23.7 |
| 6,176,108 B1 * | 1/2001 | Bae | ........................ | D06F 37/40 68/23.7 |
| 6,202,451 B1 * | 3/2001 | Park | ........................ | D06F 37/40 68/133 |
| 6,244,079 B1 * | 6/2001 | Bae | ........................ | D06F 37/40 68/133 |
| 2002/0007653 A1 * | 1/2002 | Koshiga | ........................ | D06F 37/40 68/23.7 |
| 2003/0131636 A1 * | 7/2003 | Lim | ........................ | D06F 37/40 68/23.7 |
| 2004/0168485 A1 * | 9/2004 | Lim | ........................ | D06F 37/304 68/24 |
| 2005/0011233 A1 * | 1/2005 | Vaidhyanathan | ........................ | D06F 37/40 68/23.7 |
| 2005/0081573 A1 * | 4/2005 | Han | ........................ | D06F 37/304 68/132 |
| 2005/0166643 A1 * | 8/2005 | Cho | ........................ | D06F 37/304 68/132 |
| 2005/0223754 A1 * | 10/2005 | Choi | ........................ | D06F 37/304 68/3 R |
| 2006/0010612 A1 * | 1/2006 | Kim | ........................ | D06F 37/36 68/12.24 |
| 2006/0042022 A1 * | 3/2006 | Kim | ........................ | D06F 37/304 68/132 |
| 2006/0075789 A1 * | 4/2006 | Lee | ........................ | D06F 37/40 68/12.24 |
| 2008/0042510 A1 * | 2/2008 | Park | ........................ | D06F 37/304 310/422 |
| 2012/0304704 A1 * | 12/2012 | Ponnaganti | ........................ | D06F 37/40 68/140 |
| 2013/0139557 A1 * | 6/2013 | Chen | ........................ | D06F 37/40 68/131 |
| 2014/0091662 A1 * | 4/2014 | Kim | ........................ | H02K 16/00 310/114 |
| 2014/0305172 A1 * | 10/2014 | Kim | ........................ | H02K 1/148 310/112 |
| 2015/0061560 A1 * | 3/2015 | Lee | ........................ | D06F 37/40 318/400.38 |
| 2015/0204003 A1 * | 7/2015 | Kim | ........................ | D06F 33/30 318/452 |
| 2015/0252507 A1 * | 9/2015 | Kim | ........................ | D06F 17/08 68/23.6 |
| 2015/0256056 A1 * | 9/2015 | Kim | ........................ | H02K 1/187 310/71 |
| 2015/0318805 A1 * | 11/2015 | Kim | ........................ | D06F 37/40 318/400.02 |
| 2016/0130739 A1 * | 5/2016 | Song | ........................ | H02K 7/116 68/133 |
| 2016/0168775 A1 * | 6/2016 | Kim | ........................ | H02K 16/02 310/90 |
| 2016/0201246 A1 * | 7/2016 | Song | ........................ | D06F 37/40 8/137 |
| 2016/0222572 A1 * | 8/2016 | Kim | ........................ | D06F 37/36 |
| 2016/0376741 A1 * | 12/2016 | Kim | ........................ | H02K 7/003 310/90 |
| 2017/0002499 A1 * | 1/2017 | Lv | ........................ | D06F 17/08 |
| 2017/0204551 A1 * | 7/2017 | Kim | ........................ | D06F 37/40 |
| 2017/0260680 A1 * | 9/2017 | Hirose | ........................ | D06F 37/04 |

FOREIGN PATENT DOCUMENTS

| | | | |
|---|---|---|---|
| CN | 102206913 A | | 10/2011 |
| CN | 105063965 A | * | 11/2015 |
| CN | 105063965 A | | 11/2015 |
| JP | 06261997 A | | 9/1994 |
| JP | 2001046784 A | | 2/2001 |
| JP | 2001113088 A | * | 4/2001 |
| JP | 2001113088 A | | 4/2001 |
| JP | 2001113088 A | * | 10/2001 |
| JP | 2012080998 A | | 4/2012 |
| JP | 2015167663 A | | 9/2015 |
| JP | 2015208499 A | | 11/2015 |
| WO | 2015161579 A1 | | 10/2015 |
| WO | 2017092643 A1 | | 6/2017 |

OTHER PUBLICATIONS

Makino et al., Washing machine used also for dehydration:, Oct. 2001, JP-2001113088-A—Machine Translation (Year: 2001).*
International Search Report and Written Opinion for PCT/CN2016/108216 dated Mar. 24, 2017.
Extended European Search Report received in European Patent Application No. 16870002 dated Jul. 10, 2019.
Chinese Office Action received in Chinese Patent Application No. 201680070065.0 dated Apr. 14, 2020.
Indian Examination Report received in Indian Patent Application No. 201847024151 dated May 15, 2020.

* cited by examiner

DRUM WASHING MACHINE

TECHNICAL FIELD

The present disclosure relates to a drum washing machine, which not only can continuously operate from washing to drying, but also can carry out washing without drying.

BACKGROUND

In the past, a drum washing machine rotates a transverse-shaft type drum in an outer drum which stores water at a bottom, washings are lifted up and dropped down by baffles arranged in the drum, and the washings are thrown to an inner circumferential surface of the drum, such that the washings are washed. In this structure in which the baffles are formed for stirring the washings, the washings are difficult to twine or rub against each other. Therefore, in order to improve the cleaning performance of the drum washing machine, the following structure can be adopted: an agitator is arranged on a rear surface of the drum, so that the drum and the agitator can independently rotate at different rotating speeds during washing and rinsing.

During dewatering of the drum washing machine, the drum and the agitator integrally rotate at the same rotating speed. Therefore, the drum washing machine is provided with a clutch mechanism switching a driving form between a first form in which the drum and the agitator rotate independently and a second form in which the drum and the agitator rotate integrally.

The drum and the agitator are rotationally driven by a driving motor. A rotating shaft of the drum is connected with a planet carrier of a planetary gear mechanism, and the planetary gear mechanism transfers the rotation of the driving motor to the drum. The clutch mechanism includes a clutch body and a moving mechanism. The clutch body is connected with an internal gear of the planetary gear mechanism in a manner of being unable to rotate relative to the internal gear. The moving mechanism moves the clutch body between a driving motor side and a bearing unit side of the rotating shaft supporting the drum freely and rotationally. Splines are formed on the clutch body, at the end of the rotor side and at the end of the bearing unit side along a circumferential direction, and splines corresponding to the spline on the clutch body side are formed on the rotor and the bearing unit.

In the first form, the spline of the clutch body engages with the spline of the bearing unit. Thus, an internal gear is fixed to the bearing unit through the clutch body in a manner of being unable to rotate circumferentially. When the rotor rotates in this form, the drum rotates independently of the agitator at a rotating speed lower than that of the agitator according to a reduction ratio of the planetary gear mechanism. In another aspect, in the second form, the spline of the clutch body engages with the spline of the rotor. Thus, the internal gear is fixed to the rotor through the clutch body. The drum integrally rotates with the agitator at a rotating speed equal to that of the agitator when the rotor rotates in this form.

With respect to the drum washing machine described above, when washings in the drum are biased to the left side under a condition that the drum is in a stop state, the biased washings apply a force on the drum that enables the drum to rotate anticlockwise. In another aspect, when the washings in the drum are biased to the right side, the biased washings apply a force on the drum that enables the drum to rotate clockwise.

Under a condition that the washings in the drum are biased to the left or right side, when the driving form is the first form, teeth of the spline of the clutch body engage with teeth of the spline of the bearing unit in a state of being powerfully pressed to one side, and frictional resistance between pressing surfaces of the teeth of the splines of the clutch body and the bearing unit is increased. In this way, the teeth of the splines of the clutch body and the bearing unit are difficult to be disengaged even if a moving action of the clutch body is made by virtue of the moving mechanism for switching from the first form to the second form. Therefore, the switch from the first form to the second form may not be smoothly completed.

Similarly, under a condition that the washings in the drum are biased to the left or right side, when the driving form is the second form, teeth of the spline of the clutch body engage with teeth of the spline of the rotor in a state of being powerfully pressed to one side, and frictional resistance between pressing surfaces of the teeth of the splines of the clutch body and the rotor is increased. In this way, the teeth of the splines of the clutch body and the rotor are difficult to be disengaged even if a moving action of the clutch body is made by virtue of the moving mechanism for switching from the second form to the first form. Therefore, the switch from the second form to the first form may not be smoothly completed.

SUMMARY

A purpose of the present disclosure is as follows: the drum washing machine with a rotating body on the rear of a drum can smoothly switch the driving form between a first form in which the drum and the rotating body rotate independently and a second form in which the drum and the rotating body rotate integrally.

In a first mode of the present disclosure, a drum washing machine includes: an outer drum, which is accommodated in a housing; a drum, which is accommodated in the outer drum and is capable of rotating about a horizontal axis or an inclination axis inclined relative to a horizontal direction; a rotating body, which is arranged in the rear of the drum and is provided with a protruding part on a surface of the rotating body and in contact with washings; a driving part, which is used to rotate the drum and the rotating body; and a control part, which is used to control an action of the driving part. Here, the driving part includes: a driving motor, which comprises a rotor and a stator; a first rotating shaft, which is used to transfer rotation of the rotor to the rotating body; a second rotating shaft, which is coaxially arranged with the first rotating shaft and is used to transfer the rotation of the rotor to the drum; a planetary gear mechanism, which comprises a sun gear, an internal gear, a plurality of planet gears and a planet carrier, where the sun gear rotates along with the rotation of the rotor, the internal gear is annular and surrounds the sun gear, the planet gears are arranged between the sun gear and the internal gear, the planet carrier is capable of freely and rotationally holding the planet gears, one of the planet carrier and the internal gear is fixed to the second rotating shaft; and a clutch mechanism, which is used to switch a driving form based on the driving part between a first form and a second form, where the first form is a driving form rotating the first rotating shaft and the second rotating shaft independently, and the second form is a driving form rotating the first rotating shaft and the second rotating shaft integrally. The clutch mechanism includes: a clutch body, which is connected to the other one of the planet carrier and the internal gear in such a way that the clutch body is capable of rotating together with the other one of the planet carrier and the internal gear and moving towards an axis direction of the second rotating shaft; and a moving mechanism, which is used to move the clutch body to move to a first position during switching to the first form and to move the clutch body to a second position during switching to the second form. A first engaging part with a concave-convex shape and a second engaging part with a concave-convex shape are formed in the clutch body,
a first engaged part is formed in a fixing part which does not rotate along with the rotor, the first engaged part has a concave-convex shape corresponding to the concave-convex shape of the first engaging part and engages with the first engaging part along a circumferential direction when the clutch body moves to the first position, a second engaged part is formed in a rotating part which rotates along with the rotor, the second engaged part has a concave-convex shape corresponding to the concave-convex shape of the second engaging part and engages with the second engaging part along the circumferential direction when the clutch body moves to the second position. When switching from the first form to the second form, the control part rotates the rotor clockwise in a manner of taking a first action during an action of moving the clutch body to the second position by virtue of the moving mechanism, and the control part rotates the rotor anticlockwise in a manner of taking a second action during the action of moving the clutch body to the second position by virtue of the moving mechanism, where the first action is an action of stopping the rotor rotating clockwise, and the second action is an action of stopping the rotor rotating anticlockwise.

When the clutch body moves to the first position, and when the first engaging part engages the first engaged part along the circumferential direction, the other one (e.g., the planet carrier) connected with the clutch body becomes a non-rotating state, and the driving form is switched to the first form. When the driving motor rotates, one part (e.g., the second rotating shaft connected with internal gear) rotates at a rotating speed different from the rotating speed of the first rotating shaft according to a reduction ratio of the planetary gear mechanism. Thus, the drum and the rotating body independently rotate at different rotating speeds.

In another aspect, when the clutch body moves to the second position, and when the second engaging part engages with the second engaged part along the circumferential direction, the other one connected with the clutch body becomes a state of rotating with the driving motor, and the driving form is switched to the second form. When the driving motor rotates, the second rotating shaft rotates at a rotating speed equal to the rotating speed of the first rotating shaft. Thus, the drum and the rotating body integrally rotate at the same rotating speed.

According to the above structure, the first action and the second action are taken when the clutch body moves to the second position. Under the condition that the washings are biased to the left side in the drum, the rotor rotating clockwise may apply an inertia force on the drum for continuously moving clockwise when the rotor is stopped. Therefore, the force applied by the biased washings applied on the engagement part between the first engaging part and the first engaged part is offset by the inertia force and is decreased. Similarly, under the condition that the washings are biased to the left side in the drum, when the rotor rotating anticlockwise is stopped, the force applied by the biased washings on the engagement part between the first engaging part and the first engaged part may be decreased. Therefore, no matter the washings are biased to the left side or the right side in the drum, the above structure enables to move the clutch body while decreasing the force applied on the engagement part between the first engaging part and the first engaged par, so as to facilitate the disengagement between the first engaging part and the first engaged part. Thus, the driving form can be smoothly switched from the first form to the second form.

The drum washing machine in the present embodiment may adopt the structure as follows: when switching from the second form to the first form, the control part rotates the rotor clockwise in a manner of taking the first action during an action of moving the clutch body to the first position by virtue of the moving mechanism, and the control part rotates the rotor anticlockwise in a manner of taking the second action during the action of moving the clutch body to the first position by virtue of the moving mechanism.

No matter the washings are biased to the left side or the right side in the drum, the structure enables to move the clutch body while decreasing the force applied on the engagement part between the second engaging part and the second engaged part, so as to facilitate the disengagement between the second engaging part and the second engaged part. Thus, the driving form can be smoothly switched from the second form to the first form.

In a second mode of the present disclosure, a drum washing machine includes: an outer drum, which is accommodated in a housing; a drum, which is accommodated in the outer drum and is capable of rotating about a horizontal axis or an inclination axis inclined relative to a horizontal direction; a rotating body, which is arranged in the rear of the drum and is provided with a protruding part on a surface of the rotating body and in contact with washings; a driving part, which is used to rotate the drum and the rotating body; and a control part, which is used to control an action of the driving part. Here, the driving part includes: a driving motor, which comprises a rotor and a stator; a first rotating shaft, which is used to transfer rotation of the rotor to the rotating body; a second rotating shaft, which is coaxially arranged with the first rotating shaft and is used to transfer the rotation of the rotor to the drum; a planetary gear mechanism, which comprises a sun gear, an internal gear, a plurality of planet gears and a planet carrier, where the sun gear rotates along with the rotation of the rotor, the internal gear is annular and surrounds the sun gear, the planet gears are arranged between the sun gear and the internal gear, the planet carrier is capable of freely and rotationally holding the planet gears, one of the planet carrier and the internal gear is fixed to the second rotating shaft; and a clutch mechanism, which is used to switch a driving form based on the driving part between a first form and a second form, where the first form is a driving form rotating the first rotating shaft and the second rotating shaft independently, and the second form is a driving form rotating the first rotating shaft and the second rotating shaft integrally. The clutch mechanism includes: a clutch body, which is connected to the other one of the planet carrier and the internal gear in such a way that the clutch body is capable of rotating together with the other one of the planet carrier and the internal gear and moving towards an axis direction of the second rotating shaft; and a moving mechanism, which is used to move the clutch body to move to a first position during switching to the first form and to move the clutch body to a second position during switching to the second form. A first engaging part with a concave-convex shape and a second engaging part with a concave-convex shape are formed in the clutch body, a first engaged part is formed in a fixing part which does not rotate along with the rotor, the first engaged part has a concave-convex shape corresponding to the concave-convex shape of the first engaging part and engages with the first engaging part along a circumferential direction when the clutch body moves to the first position, a second engaged part is formed in a rotating part which rotates along with the rotor, the second engaged part has a concave-convex shape corresponding to the concave-convex shape of the second engaging part and engages with the second engaging part along the circumferential direction when the clutch body moves to the second position. When switching from the first form to the second form, the control part rotates the rotor clockwise in a manner of taking a first action during an action of moving the clutch body to the first position by virtue of the moving mechanism, and the control part rotates the rotor anticlockwise in a manner of taking a second action during an action of moving the clutch body to the first position by virtue of the moving mechanism, where the first action is an action of stopping the rotor rotating clockwise, and the second action is an action of stopping the rotor rotating anticlockwise.

No matter the washings are biased to the left side or the right side in the drum, the structure enables to move the clutch body while decreasing the force applied on the engagement part between the second engaging part and the second engaged part, so as to facilitate the disengagement between the second engaging part and the second engaged part. Thus, the driving form can be smoothly switched from the second form to the first form.

The drum washing machine in the first mode or in the second mode may adopt the structure as follows: after the first action and the second action, the control part rotates the rotor along a direction opposite to a previous direction without interposing a stopping period.

According to the above structure, since the force applied on the engagement part between the first engaging part and the first engaged part and on the engagement part between the second engaging part and the second engaged part are further decreased, the disengagement between the first engaging part and the first engaged part and the disengagement between the second engaging part and the second engaged part are easier.

With respect to the drum washing machine in the first mode or the second mode, the moving mechanism may include a power source for moving the clutch body. Under such a condition, after the control part takes one of the first action and the second action, the control part takes the other one of the first action and the second action, and starts the power source operating in the course of rotating the rotor in order to take the one action.

According to the above structure, the first action or the second action can be rapidly taken after the moving action of the clutch body is started, so as to facilitate the disengagement between the first engaging part and the first engaged part and the disengagement between the second engaging part and the second engaged part.

According to the present disclosure, the driving form of the drum washing machine with the rotating body on the rear of the drum can be smoothly switched between the first form in which the drum and the rotating body rotate independently and the second form in which the drum and the rotating body rotate integrally.

Effects and significances of the present disclosure are further clarified by embodiments shown below. However, the following embodiments are just an illustration when the present disclosure is implemented, and the present disclosure is not limited by any content described in the following embodiments.

DETAILED DESCRIPTION

Hereinafter, an embodiment of a drum washing machine in the present disclosure, i.e., a drum washing machine without a drying function, is described by referring to drawings.

Figure 1:
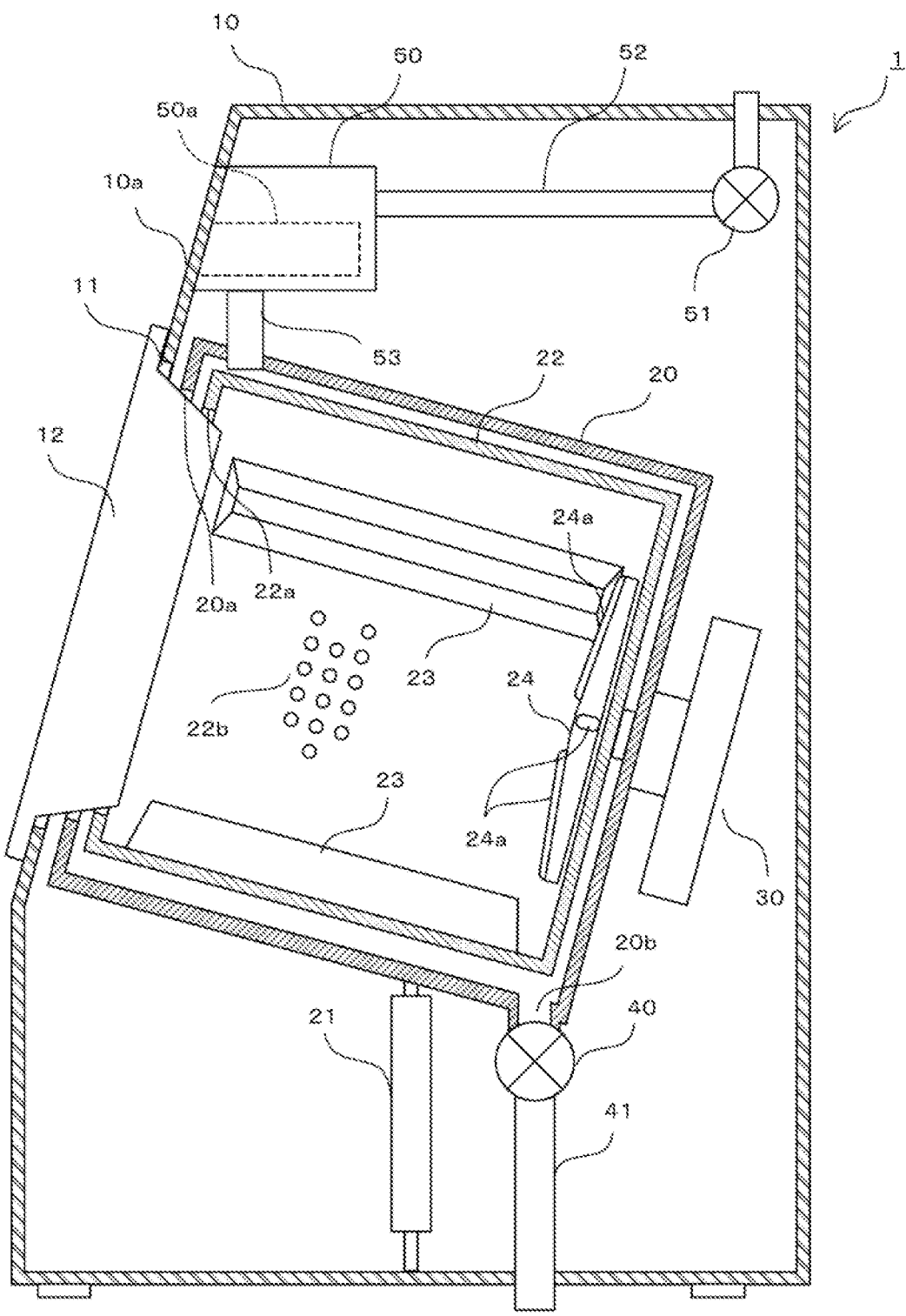
FIG. 1 is a side sectional view illustrating a structure of a drum washing machine involved in an embodiment.

FIG. 1 is a side sectional view illustrating a structure of a drum washing machine 1.

The drum washing machine 1 includes a housing 10 forming an appearance. A front surface 10a of the housing 10 is inclined from a central part to an upper part, and a throwing inlet 11 for washings is formed in the inclined surface. The throwing inlet 11 is covered by a door 12 which is freely opened and closed.

An outer drum 20 is elastically supported by a plurality of vibration dampers 21 in the housing 10. A drum 22 is arranged in the outer drum 20 in a free rotation manner. The outer drum 20 and the drum 22 are inclined in such a manner that a rear surface side is lowered relative to a horizontal direction. Thus, the drum 22 rotates about an inclination axis inclined relative to the horizontal direction. The inclination angle of the outer drum 20 and the drum 22 may be set to about 10-20 degrees. An opening part 20a on the front surface of the outer drum 20 and an opening part 22a on the front surface of the drum 22 face the throwing inlet 11, and are opened and closed by the door 12, together with the throwing inlet 11. A plurality of dewatering holes 22b are formed in an inner circumferential surface of the drum 22. Further, three baffles 23 are arranged on the inner circumferential surface of the drum 22 in the circumferential direction at roughly equal intervals.

An agitator 24 is arranged at the rear of the drum 22 in a free rotation manner. The agitator 24 has a roughly disc shape. A plurality of blades 24a that radially extend from the central part are formed on the surface of the agitator 24. The agitator 24 coaxially rotates with the drum 22. The agitator 24 is equivalent to a rotating body in the present disclosure, and the blades 24a are equivalent to the protruding parts in the present disclosure.

A driving unit 30 capable of generating a torque for driving the drum 22 and the agitator 24 is arranged at the rear of the outer drum 20. The driving unit 30 is equivalent to a driving part in the present disclosure. The driving unit 30 enables the drum 22 and the agitator 24 to rotate at different rotating speeds in the same direction in a washing process and a rinsing process. Specifically, the driving unit 30 enables the drum 22 to rotate at such a rotating speed that the centrifugal force applied to the washings in the drum 22 is smaller than gravity, and enables the agitator 24 to rotate at a rotating speed higher than the rotating speed of the drum 22. In another aspect, the driving unit 30 enables the drum 22 and the agitator 24 to integrally rotate at such a rotating speed that the centrifugal force applied to the washings in the drum 22 is much larger than the gravity in a dewatering process. The structure of the driving unit 30 is described below in detail.

A water outlet 20b is formed on the bottom of the outer drum 20. A drainage valve 40 is arranged in the water outlet 20b. The drainage valve 40 is connected with a drainage hose 41. When the drainage valve 40 is opened, water stored in the outer drum 20 is discharged out of the machine through the drainage hose 41.

A detergent box 50 is arranged in the upper part of the front in the housing 10. A detergent container 50a containing detergents is contained in the detergent box 50 in a manner of being withdrawn from the front. The detergent box 50 is connected through the water supply hose 52 with a water supply valve 51, which is arranged in the upper part at the rear in the housing 10. In addition, the detergent box 50 is connected with the upper part of the outer drum 20 through a water injection pipe 53. When the water supply valve 51 is opened, running water from a faucet is supplied into the outer drum 20 through the water supply hose 52, the detergent box 50 and the water injection pipe 53. At this moment, the detergents contained in the detergent container 50a are supplied into the outer drum 20 along with the water flow.

Then, the structure of the driving unit 30 is described in detail.

Figure 2:
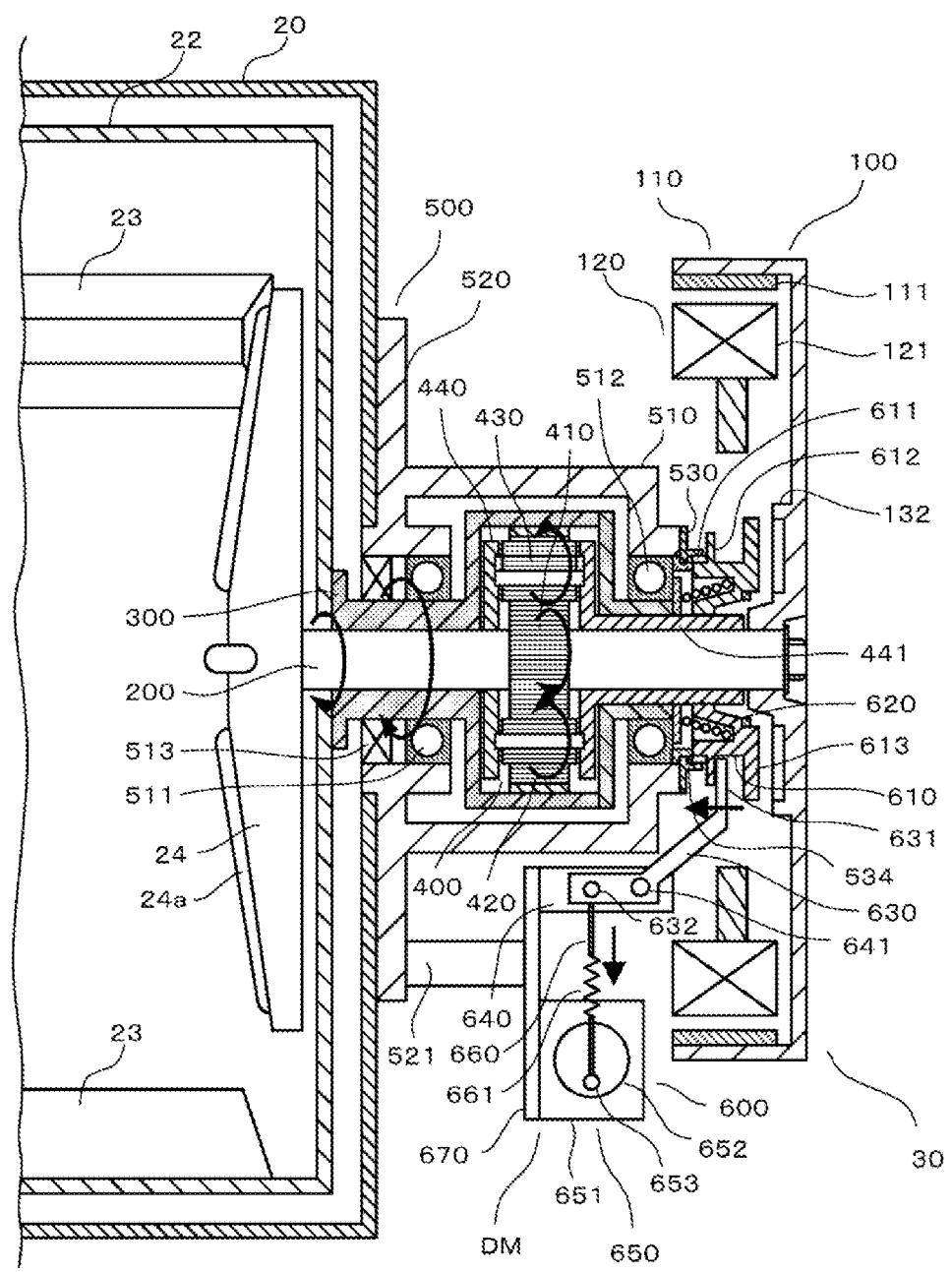
FIG. 2 is a sectional view illustrating a structure of a driving unit involved in an embodiment.
Figure 3:
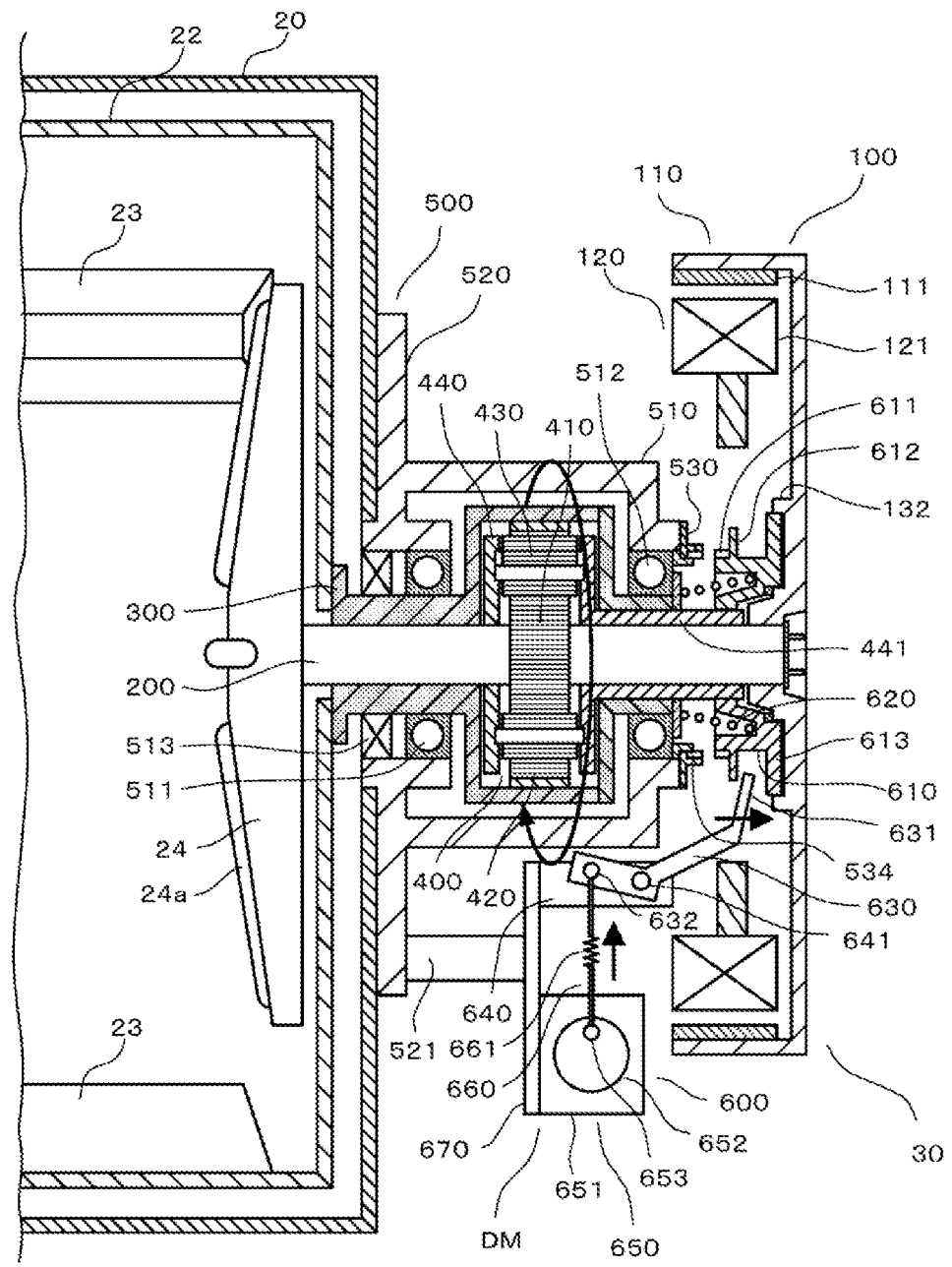
FIG. 3 is a sectional view illustrating a structure of a driving unit involved in an embodiment.
Figure 4:
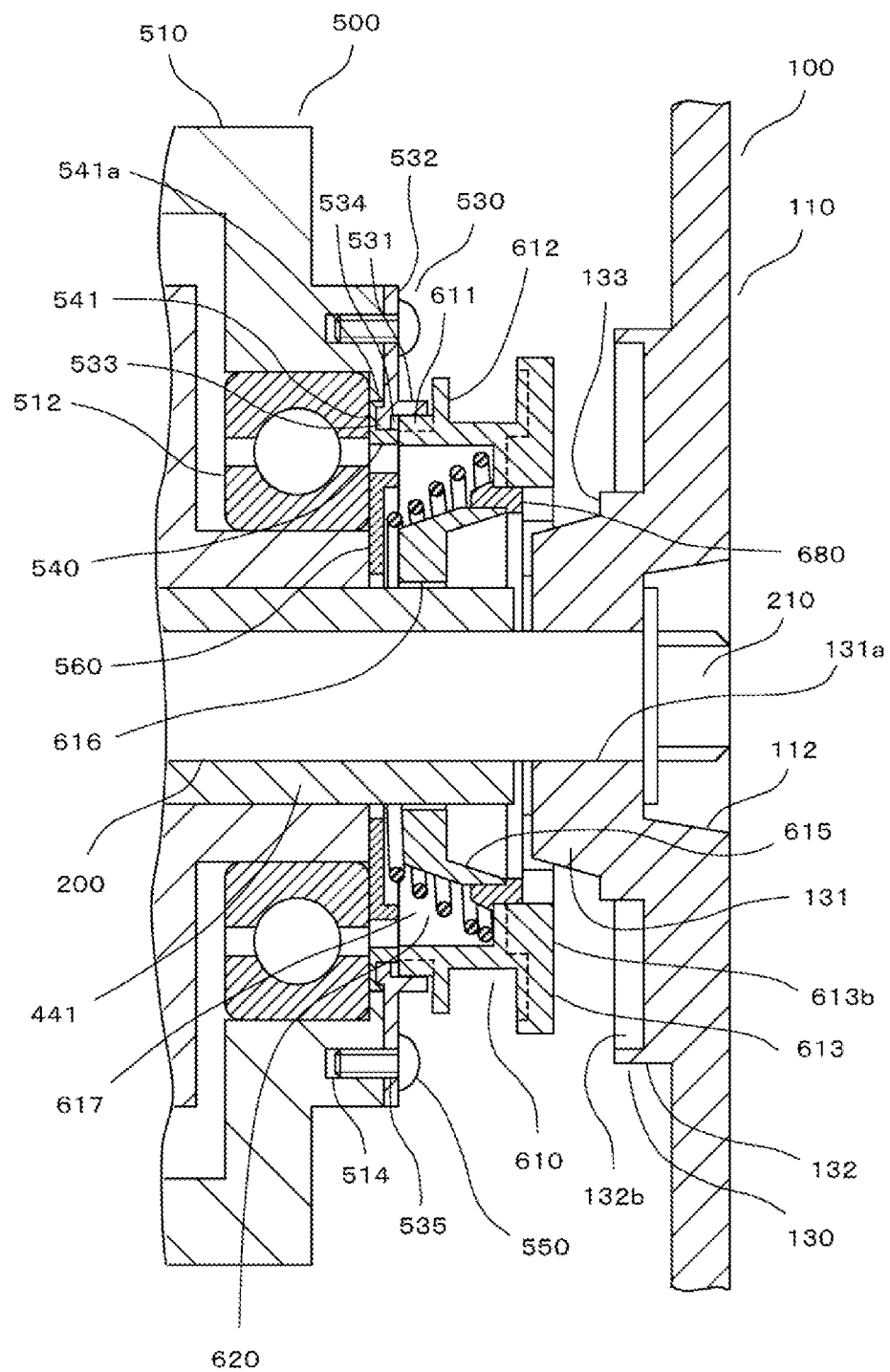
FIG. 4 is a sectional view illustrating a main part in an enlarged view of a periphery of a clutch body involved in an embodiment.
Figure 5:
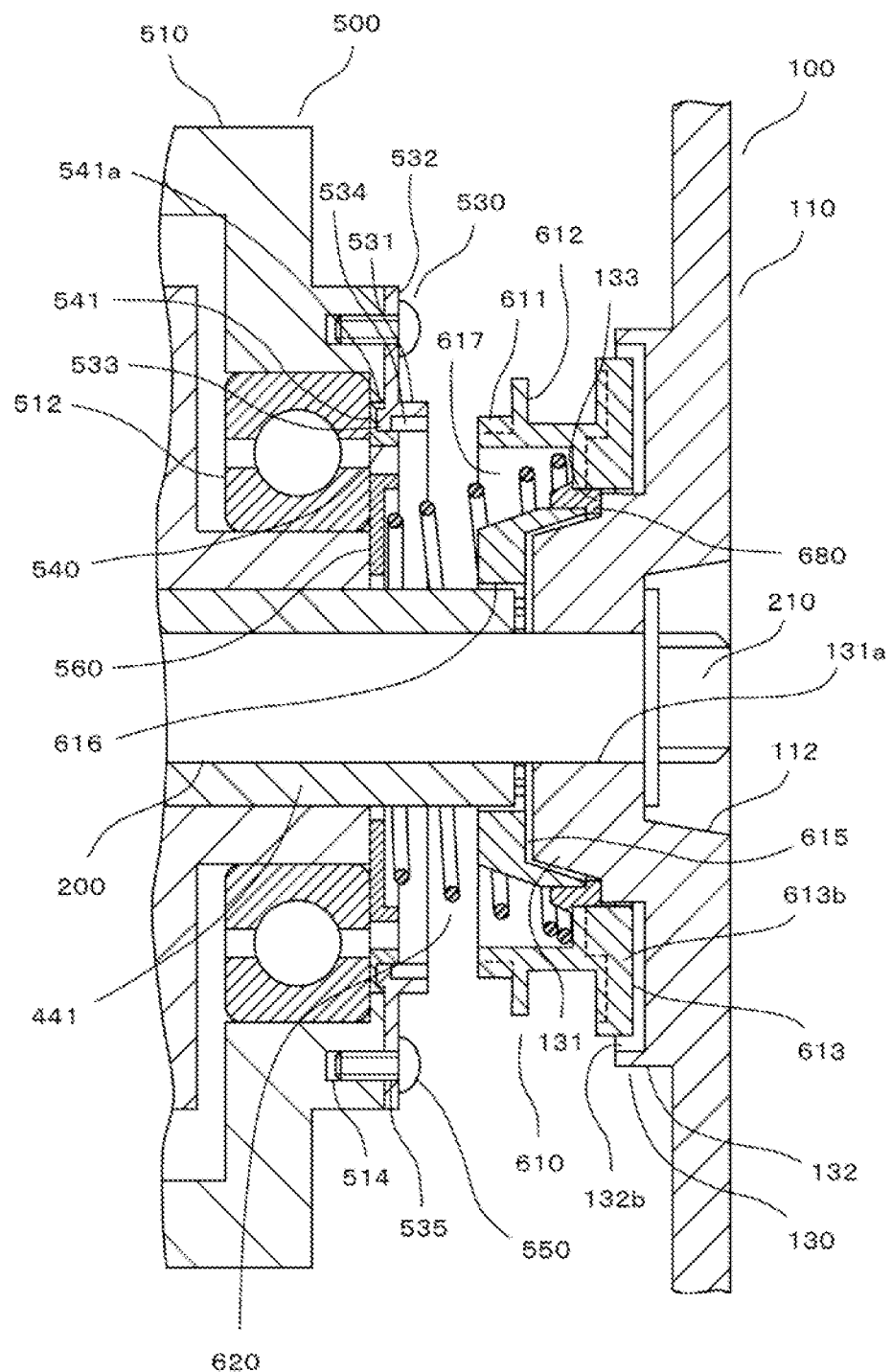
FIG. 5 is a sectional view illustrating a main part in an enlarged view of a periphery of a clutch body involved in an embodiment.
Figure 6:
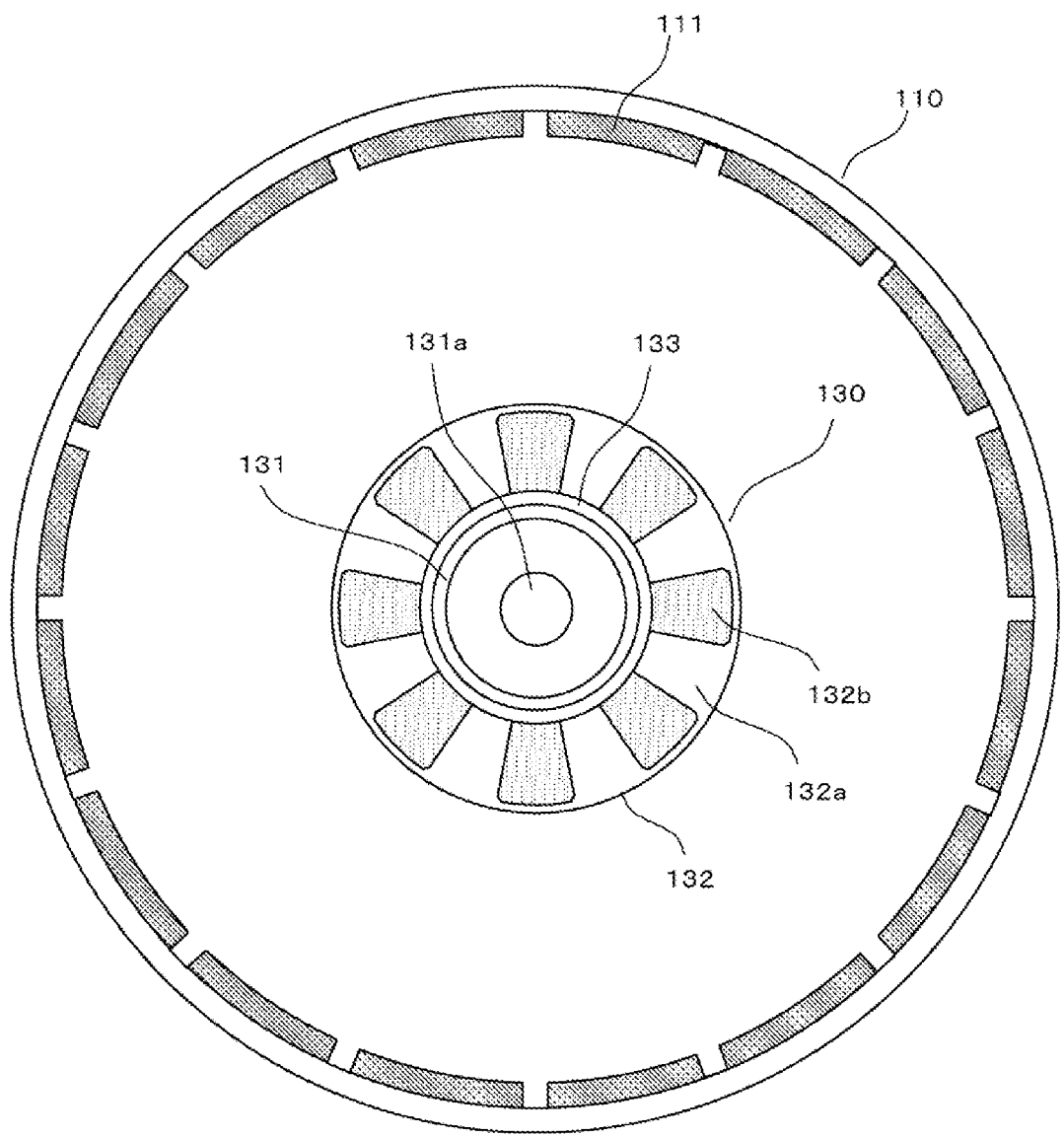
FIG. 6 is a front view illustrating a rotor of a driving motor involved in an embodiment.
Figure 7A:
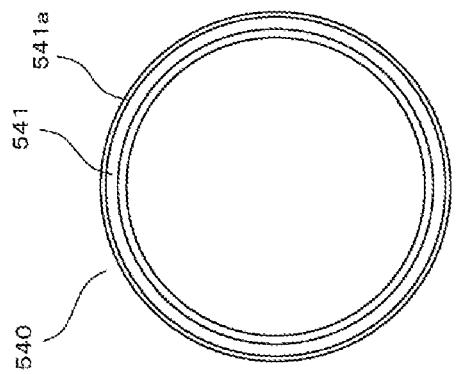
FIGS. 7(a) and (b) are respectively a front view and a rear view illustrating a clutch carrying plate involved in an embodiment.
Figure 7B:
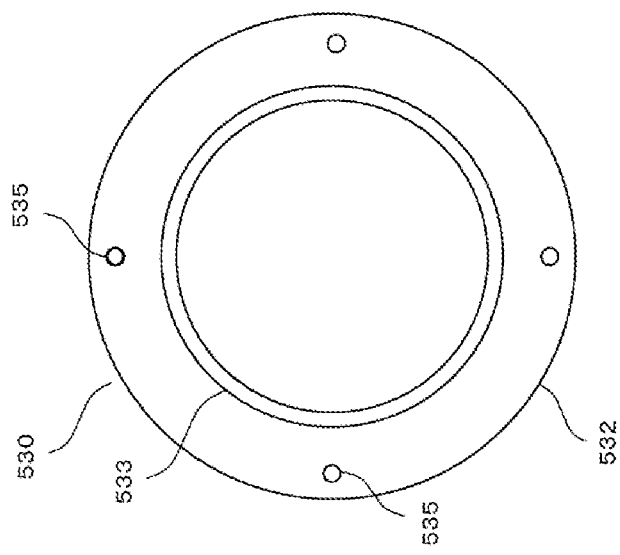
FIG. 7(c) is a front view illustrating a bearing-side buffer member.
Figure 7C:
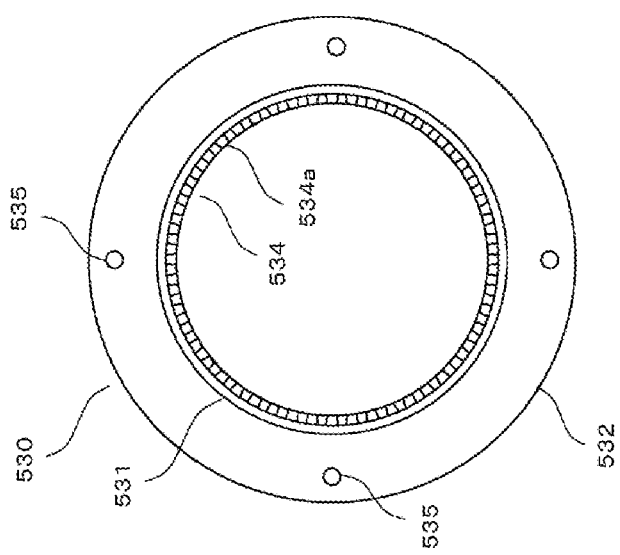
Figure 8C:
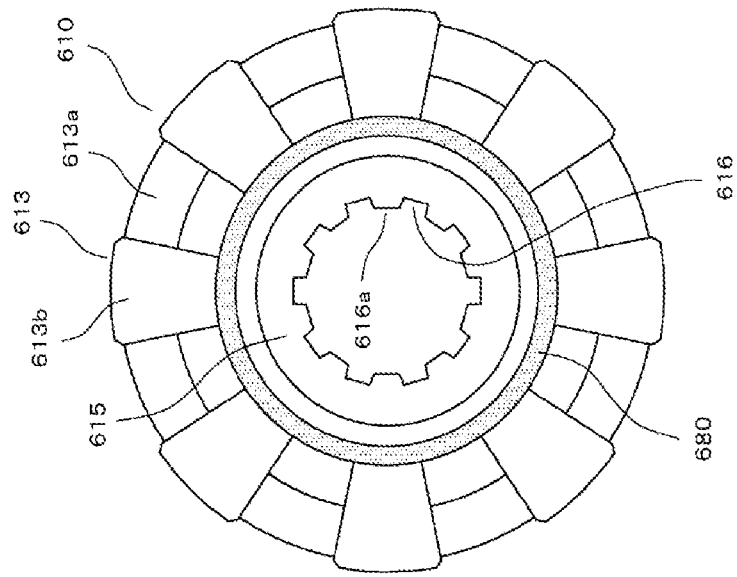
FIGS. 8(a), (b) and (c) are respectively a front view, a side longitudinal sectional view and a rear view illustrating a clutch body involved in an embodiment.
FIG. 8(d) is a sectional view illustrating a planet carrier shaft involved in an embodiment.
Figure 8B:
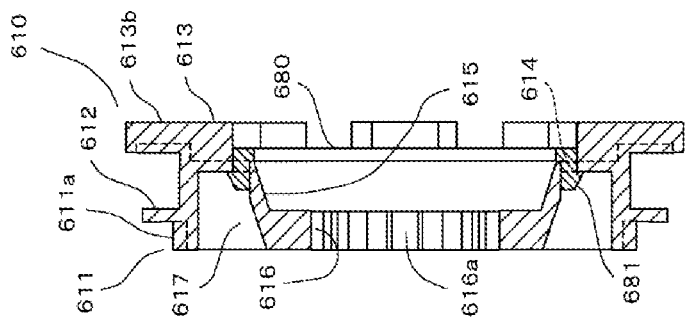
Figure 8A:
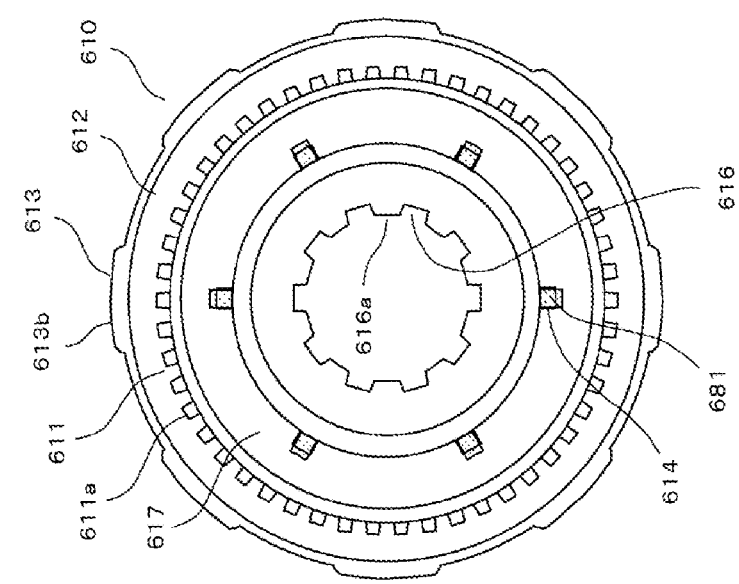
Figure 8D:
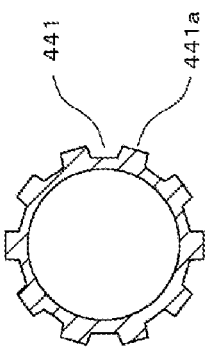

FIG. 2 and FIG. 3 are sectional views illustrating a structure of a driving unit 30. FIG. 4 and FIG. 5 are sectional views illustrating a main part in an enlarged view of a periphery of a clutch body 610. FIG. 2 and FIG. 4 show a state of switching a driving form of the driving unit 30 to a biaxial driving form. FIG. 3 and FIG. 5 show a state of switching a driving form of the driving unit 30 to a uniaxial driving form. FIG. 6 is front view illustrating a rotor 110 of a driving motor 100. FIGS. 7(a) and (b) are respectively a front view and a rear view illustrating a clutch carrying plate 530; FIG. 7(c) is a front view illustrating a bearing-side buffer member 540. FIGS. 8(a), (b) and (c) are respectively a front view, a side longitudinal sectional view and a rear view illustrating a clutch body 610; FIG. 8(d) is a sectional view illustrating a planet carrier shaft 441. It should be noted that a clutch lever 630 is not shown in FIG. 4 and FIG. 5.

The driving unit 30 includes: a driving motor 100, a wing shaft 200, a drum shaft 300, a planetary gear mechanism 400, a bearing unit 500 and a clutch mechanism 600. The driving motor 100 generates a torque for driving the agitator 24 and the drum 22. The wing shaft 200 rotates through the torque of the driving motor 100, and transfers the rotation to the agitator 24. The planetary gear mechanism 400 decelerates the rotation of the wing shaft 200 (i.e., the rotation of the rotor 110 of the driving motor 100) and transfers the rotation to the drum shaft 300. The drum shaft 300 rotates coaxially with the wing shaft 200 at the rotating speed reduced by the planetary gear mechanism 400, and transfers the rotation to the drum 22. The bearing unit 500 supports the wing shaft 200 and the drum shaft 300 in a free rotation manner. The clutch mechanism 600 switches the driving form of the driving unit 30 between the biaxial driving form and the uniaxial driving form. The biaxial driving form is a driving form that rotates the agitator 24 (i.e., the wing shaft 200) at a rotating speed equal to the rotating speed of the driving motor and rotates the drum 22 (i.e., the drum shaft 300) at a rotating speed reduced by the planetary gear mechanism 400. The uniaxial driving form is a driving form that rotates the agitator 24 and the drum 22 (i.e., the wing shaft 200, the drum shaft 300 and the planetary gear mechanism 400) to integrally rotate at a rotating speed equal to the rotating speed of the driving motor 100. The wing shaft 200 is equivalent to a first rotating shaft in the present disclosure, and the drum shaft 300 is equivalent to a second rotating shaft in the present disclosure. The biaxial driving form is equivalent to a first form in the present disclosure, and the uniaxial driving form is equivalent to a second form in the present disclosure.

The driving motor 100 is an external rotor DC brushless motor and includes a rotor 110 and a stator 120. The rotor 110 has a bottomed cylinder shape and is formed of reinforced resin formed by mixing a reinforcing material such as glass in the resin. Permanent magnets 111 are arranged throughout the entire circumference on the inner circumferential surface of the rotor 110. As shown in FIG. 4, FIG. 5 and FIG. 6, a clutch carrying part 130 and the rotor 110 are integrally formed on a central part of the rotor 110. The clutch carrying part 130 and the driving motor 100 (i.e., the rotor 110) are rotated together.

The clutch carrying part 130 includes a lug boss part 131, an engaged part 132 and a contact surface 133. The lug boss part 131 has a section of a roughly trapezoidal shape, and forms a lug boss hole 131a, through which the wing shaft 200 penetrates, in the central part. The lug boss hole 131a is communicated with a recess 112 formed in the central part of a rear surface of the rotor 110. The engaged part 132 is formed at a periphery of the lug boss part 131, and has a roughly circular shape. On the engaged part 132, a plurality of engaging recesses 132b recessed towards a deeper side than the surface 132a of the engaged part 132 are formed along the circumferential direction at roughly equal intervals. In this way, a concave-convex shape is formed along the circumferential direction on the engaged part 132 through the surface 132a and the engaging recesses 132b. The contact surface 133 is arranged between the lug boss part 131 and the engaged part 132, and has a flat surface protruded by a section from the surface 132a of the engaged part 132. The clutch carrying part 130 is equivalent to a rotating part in the present disclosure, and the engaged part 132 is equivalent to a second engaged part in the present disclosure.

A coil 121 is arranged on an outer circumferential part of the stator 120. When a driving current is supplied to the coil 121 of the stator 120 from an aftermentioned motor driving part, the rotor 110 rotates.

The drum shaft 300 has a hollow shape and internally encircles the wing shaft 200 and the planetary gear mechanism 400. The central part of the drum shaft 300 is bulged outwards. The bulged part forms an accommodating part for the planetary gear mechanism 400.

The planetary gear mechanism 400 includes: a sun gear 410, an annular inner gear 420 encircling the sun gear 410, groups of planet gears 430 between the sun gear 410 and the inner gear 420, and a planet carrier 440 holding the planet gears 430 in a free rotation manner.

The sun gear 410 is fixed to the wing shaft 200, and rotates along with the rotation of the driving motor 100. The inner gear 420 is fixed to the drum shaft 300. A group of planet gears 430 includes a first gear and a second gear which engage with each other and rotate in opposite directions. The planet carrier 440 includes a planet carrier shaft 441 extending backwards. The planet carrier shaft 441 is coaxial with the drum shaft 300, and is internally hollowed to insert the wing shaft 200.

A rear end of the wing shaft 200 protrudes backwards from the planet carrier shaft 441, and is fixed to the lug boss hole 131a of the rotor 110 through an mounting bolt 210. A head of the mounting bolt 210 is contained in the recess 112 of the rotor 110, and does not further protrude backwards than the rotor 110.

A cylindrical bearing part 510 is arranged on the central part of the bearing unit 500. In the bearing part 510, rolling bearings 511 and 512 are arranged on the front and on the rear. A mechanical seal 513 is arranged on the front end part. An outer circumferential surface of the drum shaft 300 is carried by the rolling bearings 511 and 512, and rotates smoothly in the bearing part 510. In addition, the mechanical seal 513 is used to prevent water from entering the gap between the bearing part 510 and the drum shaft 300.

On the bearing unit 500, a fixing flange 520 is formed around the bearing part 510. An mounting lug boss 521 is formed on a lower end part of the fixing flange 520.

A clutch carrying plate 530 is installed on a rear end part of the bearing part 510. As shown in FIG. 4, FIG. 5 and FIGS. 7(a) and (b), the clutch carrying plate 530 is made of reinforced resin identical with the reinforced resin of the rotor 110, and includes a carrying body 531, a flange 532 and a push-press part 533. The carrying body 531 is formed in a flat cylindrical shape, and has a spline 534 on an inner side surface. The teeth 534a of the spline 534 are formed along the circumferential direction of the carrying body 531 at roughly equal intervals, and protrude towards an inner side of the carrying body 531. The flange 532 is formed on an outer circumferential surface of the carrying body 531 and has a circular shape. On the flange 532, inserting through holes 535, through which screws 550 penetrate, are formed at multiple positions. The push-press part 533 protrudes from the carrying body 531 to the rolling bearing 512, and has a circular shape. The clutch carrying plate 530 is equivalent to a fixing part in the present disclosure, and the spline 534 is equivalent to the first engaged part in the present disclosure.

The clutch carrying plate 530 is fixed to a rear end part of the bearing part 510 through the screws 550. The screws 550 penetrate through the inserting through holes 535 and are fastened to screw holes 514 formed at the rear end part of the bearing part 510.

A bearing-side buffer member 540 is arranged at an inner circumferential side of the carrying body 531 of the clutch carrying plate 530. As shown in FIG. 4, FIG. 5 and (c) of FIG. 7, the bearing-side buffer member 540 has a flat cylindrical shape, and is made of elastic material such as rubber. The bearing-side buffer member 540 has an annular flange 541. The flange 541 is clamped between the rolling bearing 512 of the bearing part 510 and the push-press part 533 of the clutch carrying plate 530, and is pressed towards the rolling bearing 512 side through the push-press part 533. Thus, the bearing-side buffer member 540 is fixed to the clutch carrying plate 530 side. The flange 541 has an annular protruding part 541a at the outer circumferential edge, and the protruding part 541a comes into contact with the outer circumferential surface of the push-press part 533 so that the flange 541 is difficult to get away from the position between the rolling bearing 512 and the push-press part 533. Further, a spring carrying part 560 is arranged behind the rolling bearing 512 and at the inner side of the bearing-side buffer member 540.

The bearing unit 500 is fixed to a rear surface of the outer drum 20 via the fixing flange 520 through fixing methods such as screw fastening. In a state where the driving unit 30 is installed on the outer drum 20, the wing shaft 200 and the drum shaft 300 enter the outer drum 20. The drum 22 is fixed to the drum shaft 300, and the agitator 24 is fixed to the wing shaft 200.

The clutch mechanism 600 includes: a clutch body 610, a clutch spring 620, a clutch lever 630, a lever supporter 640, a clutch driving apparatus 650, a relay rod 660 and an mounting plate 670. The clutch spring 620, the clutch lever 630, the lever supporter 640, the clutch driving apparatus 650 and the relay rod 660 form a moving mechanism DM that moves the clutch body 610.

As shown in FIG. 4, FIG. 5 and FIGS. 8(a), (b) and (c), the clutch body 610 is made of the reinforced resin identical with the reinforced resin of the rotor 110, and has a roughly disc shape. An annular spline 611 is formed on an outer circumferential surface at a front end part of the clutch body 610. The teeth 611a of the spline 611 are formed along the circumferential direction of the clutch body 610 at rough equal intervals, and protrude towards the outer side of the clutch body 610. The spline 611 is equivalent to the first engaging part in the present disclosure. In addition, a flange 612 is formed on the outer circumferential surface of the clutch body 610 at a rear part of the spline 611.

An engaging part 613 is formed at a rear end part of the clutch body 610. The engaging part 613 has an annular base surface 613a, and engaging bulges 613b protruding backwards are formed along the circumferential direction on the base surface 613a at roughly equal intervals. The engaging bulges 613b have roughly the same shape as the engaging recesses 132b of the engaged part 132. In this way, the engaging part 613 has a concave-convex shape along the circumferential direction through the base surface 613a and the engaging bulges 613b. Further, a rotor-side buffer member 680 is arranged at the rear end part of the clutch body 610 and at the inner side of the engaging part 613. The rotor-side buffer member 680 is made of elastic material such as rubber, and has an annular shape. On the rotor-side buffer member 680, claws 681 are formed at multiple positions on a depth direction side. On the rotor-side buffer member 680, the claws 681 are inserted into holes 614 formed in the rear end part of the clutch body 610 so that top end parts of the claws 681 are clamped to the depth direction side of the holes 614 and then fixed to the clutch body 610. The engaging part 613 is equivalent to the second engaging part in the present disclosure.

In the clutch body 610, in order to prevent the clutch body 610 from coining into contact with the lug boss part 131 of the clutch carrying part 130, a truncated conical recess 615 is formed at the inner side of the rotor-side buffer member 680. In addition, a shaft hole 616, that extends from the front end part of the clutch body 610 to the recess 615, is formed in the center of the clutch body 610. A spline 616a is formed at the shaft hole 616. In another aspect, as shown in FIG. 8(d), a spline 441a corresponding to the spline 616a is formed on the planet carrier shaft 441. When the planet carrier shaft 441 is inserted into the shaft hole 616, the spline 616a engages with the spline 441a. Thus, the clutch body 610 is in a state where the clutch body 610 can move along a front-back direction relative to the planet carrier shaft 441 but cannot rotate along the circumferential direction.

On the clutch body 610, an annular containing groove 617 is formed at an outer side of the shaft hole 616. The containing groove 617 contains a clutch spring 620. One end of the clutch spring 620 is carried by the spring carrying part 560, and the other end is carried by a bottom surface of the containing groove 617.

The clutch lever 630 is supported by a supporting shaft 641 arranged on a level supporter 640 in a free rotation manner. On an upper end part of the clutch lever 630, a push-press part 631, which is in contact with a rear surface of the flange 612 of the clutch body 610 and pushes the flange 612 forwards. In addition, an mounting shaft 632 is formed at a lower end part of the clutch lever 630.

The clutch driving apparatus 650 is arranged under the clutch lever 630. The clutch driving apparatus 650 includes a torque motor 651 and a disc-shaped cam 652 which rotates around a horizontal axis through a torque of the torque motor 651. On an upper surface of the cam 652, a camshaft 653 is arranged at an outer circumferential part. A rotation center of the cam 652 and a center of the mounting shaft 632 of the clutch lever 630 are consistent along a front-back direction. The torque motor 651 is equivalent to a power source in the present disclosure.

The relay rod 660 extends along an up-down direction and is connected with the clutch lever 630 and the cam 652. An upper end part of the relay rod 660 is installed on the mounting shaft 632 of the clutch lever 630, and a lower end part is installed on the camshaft 653 of the cam 652. A spring 661 is integrally formed in a middle position of the relay rod 660. The spring 661 is an extension spring.

The lever supporter 640 and the clutch driving apparatus 650 are fixed to the mounting plate 670 through fixing methods such as screw fastening. The mounting plate 670 is fixed to an mounting lug boss 521 of the bearing unit 500 through a screw.

Under a condition that the driving form of the driving unit 30 is switched from the uniaxial driving form to the biaxial driving form, as shown in FIG. 2, the torque motor 651 operates to rotate the cam 652 in such a manner that the camshaft 653 is located at a lowest part. With the rotation of the cam 652, the lower end part of the clutch lever 630 is pulled to a lower part by the relay rod 660. The clutch lever 630 rotates forwards about the supporting shaft 641. The push-press part 631 pushes the clutch body 610 forwards. The clutch body 610 resists elasticity of the clutch spring 620 and moves forwards. A spline 611 of the clutch body 610 engages with a spline 503 of the clutch carrying plate 530 along the circumferential direction.

When the camshaft 653 moves to a specified middle position, the spline 611 of the clutch body 610 reaches the engaging position where the spline 611 engages with the spline 534. At this moment, the spring 661 of the relay rod 660 is in a state of natural length. Since the clutch body 610 does not move to a position closer to the front than the engaging position, when the camshaft 653 moves from the specified position to the lowest position, as shown in FIG. 2, the spring 661 extends to the lower part. In this way, since the clutch lever 630 is pulled by the spring 661 and rotates forwards, a push-press force is applied by the push-press part 631 on the clutch body 610 in the engaging position. Thus, the spline 611 reliably engages with the spline 534.

When the spline 611 engages with the spline 534, since the clutch body 610 is in a state incapable of rotating relative to the bearing unit 500, the planet carrier shaft 441 of the planetary gear mechanism 400, i.e., the planet carrier 440, is in a state of being fixed not to rotate. In this state, when the rotor 110 rotates, the wing shaft 200 rotates at a same rotating speed as that of the rotor 110, and the agitator 24 connected with the wing shaft 200 also rotates at a same rotating speed as that of the rotor 110. For the planetary gear mechanism 400, the sun gear 410 rotates with the rotation of the wing shaft 200. As mentioned above, since the planet carrier 440 is in a fixed state, a first gear and a second gear of the planet gear 430 respectively rotate in a same direction and a reverse direction as the sun gear 410, and the inner gear 420 rotates in a same direction as the sun gear 410. Thus, the drum shaft 300 fixed to the inner gear 420 rotates in the same direction as the wing shaft 200 at a rotating speed lower than that of the wing shaft 200, and the drum 22 fixed to the drum shaft 300 rotates in the same direction as the agitator 24 at a rotating speed lower than that of the drum shaft 300. In other words, the agitator 24 rotates in the same direction as the drum 22 at a rotating speed higher than that of the drum 22.

In another aspect, under a condition that the driving form of the driving unit 30 is switched from the biaxial driving form to the uniaxial driving form, as shown in FIG. 3, the cam 652 is rotated through the operation of the torque motor 651 in such a manner that the camshaft 653 is located at an uppermost part. When the cam 652 rotates and the camshaft 653 moves upwards, the spring 661 is contracted first. When the spring 661 restores to the natural length, then the relay rod 660 moves upwards with the movement of the camshaft 653, and the lower end part of the clutch lever 630 is pushed by the relay rod 660 and moves upwards. The clutch lever 630 rotates backwards about the supporting shaft 641, and the push-press part 631 leaves the flange 612 of the clutch body 610. The clutch body 610 moves backwards through elasticity of the clutch spring 620, and the engaging part 613 of the clutch body 610 engages with the engaged part 132 of the clutch carrying part 130 along the circumferential direction.

When the engaging part 613 engages with the engaged part 132, the clutch body 610 is in a state capable of rotating together with the rotor 110. In this state, when the rotor 110 rotates, the wing shaft 300 and the clutch body 610 rotate at a same rotating speed as that of the rotor 110. At this moment, for the planetary gear mechanism 400, the sun gear 410 and the planet carrier 440 rotate at a same rotating speed as that of the rotor 110. Thus, the inner gear 420 rotates at a same rotating speed as that of the sun gear 410 and the planet carrier 440, and the drum shaft 300 fixed to the inner gear 420 rotates at a same rotating speed as that of the rotor 110. Namely, in the driving unit 30, the wing shaft 200, the planetary gear mechanism 400 and the drum shaft 300 integrally rotate. Thus, the drum 22 and the agitator 24 integrally rotate.

Figure 9A:
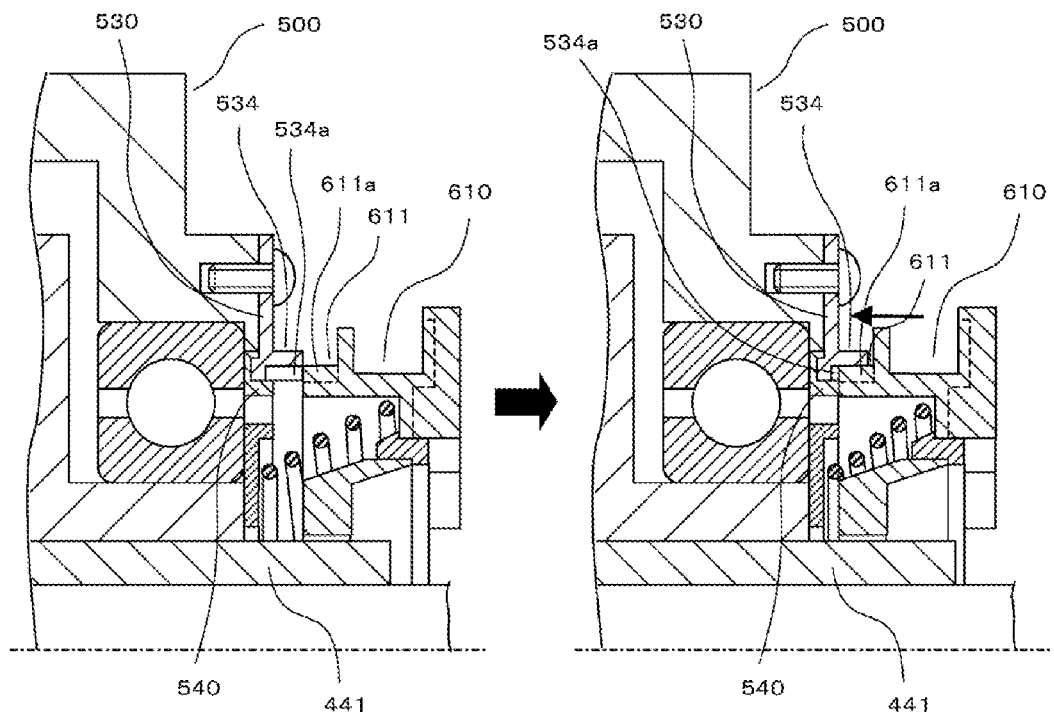
FIG. 9(a) is a state transition diagram illustrating an engagement pattern between a spline of a clutch body and a spline of a clutch carrying plate during switching from a uniaxial driving form to a biaxial driving involved in an embodiment.
Figure 9B:
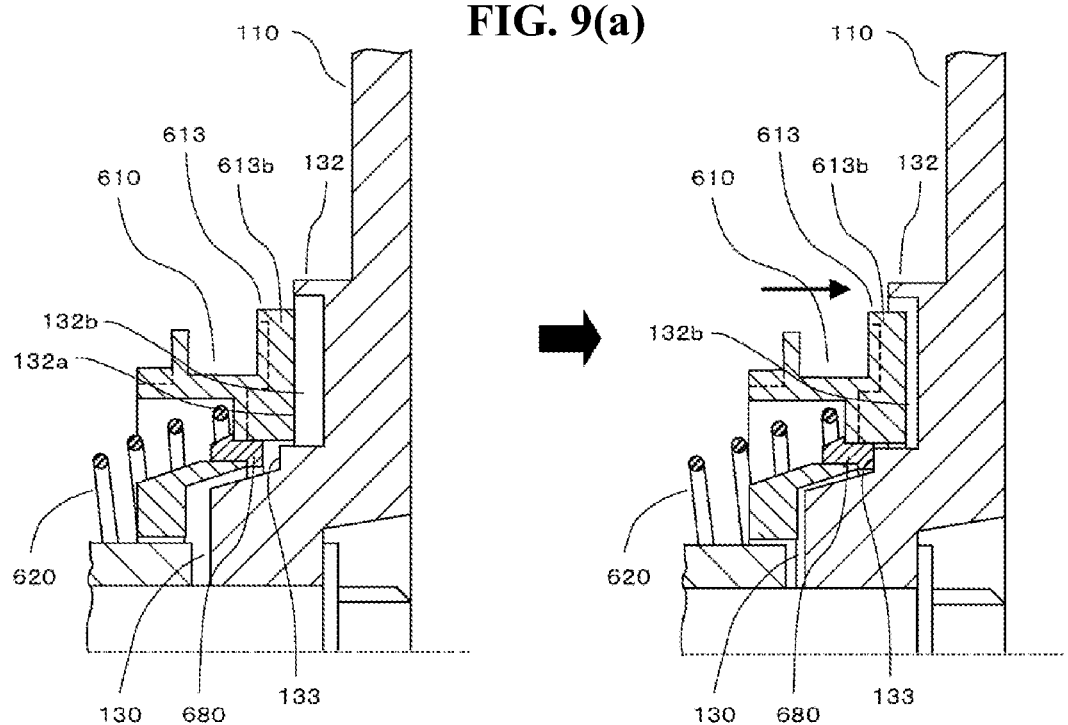
FIG. 9(b) is a state transition diagram illustrating an engagement pattern between an engaging part of the clutch body and an engaged part of the clutch carrying part during switching from the biaxial driving form to the uniaxial driving involved in an embodiment.

FIG. 9(a) is a state transition diagram illustrating an engagement pattern between a spline 611 of a clutch body 610 and a spline 534 of a clutch carrying plate 530 during switching from a uniaxial driving form to a biaxial driving form, and FIG. 9(b) is a state transition diagram illustrating an engagement pattern between an engaging part 613 of a clutch body 610 and an engaged part 132 of a clutch carrying part 130 during switching from a biaxial driving form to a uniaxial driving form.

When the clutch body 610 moves to the clutch carrying plate 530 side of the bearing unit 500 in order to switch to the biaxial driving form, as shown in the left figure of FIG. 9(a), teeth 611a of the spline 611 and teeth 534a of the spline 534 may not engage but collide with each other. In this state, as mentioned above, the clutch body 610 is continuously pushed by the clutch lever 630 to the clutch carrying plate 530 side. Moreover, in this state, as the rotor 110 rotates, the inner gear 420 that is connected with the drum 22 and bears a large load does not rotate, while the planet carrier 440 that bears a small load rotates and the clutch body 610 rotates through the planet carrier shaft 441. When the teeth 611a of the spline 611 of the clutch body 610 is staggered to a position not affected by the teeth 534a of the spline 534 of the clutch carrying plate 530 through the rotation of the clutch body 610, as shown in the right figure of FIG. 9(a), the clutch body 610 moves fast to the clutch carrying plate 530 side, and the teeth 611a engage with the teeth 534a. At this moment, since the bearing-side buffer member 540 of the clutch carrying plate 530 side firstly comes into contact with the front end part of the clutch body 610 on an opposite side, impact force applied on the clutch carrying plate 530 side of the clutch body 610 is absorbed by the bearing-side buffer member 540 and is weakened. Thus, an impact sound generated between the clutch body 610 side and the clutch carrying plate 530 side is reduced.

Similarly, when the clutch body 610 is moved to the clutch carrying part 130 side of the rotor 110 in order to switch to the uniaxial driving form, as shown in the left figure of FIG. 9(b), it may occur that the engaging bulge 613b of the engaging part 613 does not engage with the engaging recess 132b of the engaged part 132 and the engaging bulge 613b collides with the surface 132a of the engaged part 132. In this state, as mentioned above, the clutch body 610 is continuously pushed by the clutch spring 620 to the clutch carrying part 130 side. In this state, as the rotor 110 rotates, when the engaging recess 132b of the engaged part 132 is staggered to a position consistent with the engaging bulge 613b of the engaging part 613, as shown in the right figure of FIG. 9(b), the clutch body 610 moves fast to the clutch carrying part 130 side, and the engaging bulge 613b engages with the engaging recess 132b. At this moment, since the rotor-side buffer member 680 of the clutch body 610 side firstly comes into contact with the contact surface 133 of clutch carrying part 130, the impact force applied on the clutch carrying part 130 side of the clutch body 610 is absorbed by the rotor-side buffer member 680 and is weakened. Thus, an impact sound generated between the clutch body 610 side and the clutch carrying part 130 side is reduced.

It should be noted that the rotor 110, the clutch carrying plate 530 and the clutch body 610 are made of the reinforced resin. Therefore, under a condition that the bearing-side buffer member 540 and the rotor-side buffer member 680, which are harder than ordinary resin, are not arranged, the impact sound between the clutch body 610 side and the clutch carrying plate 530 and the impact sound between the clutch body 610 side and the clutch carrying part 130 side are especially easy to increase.

Figure 10:
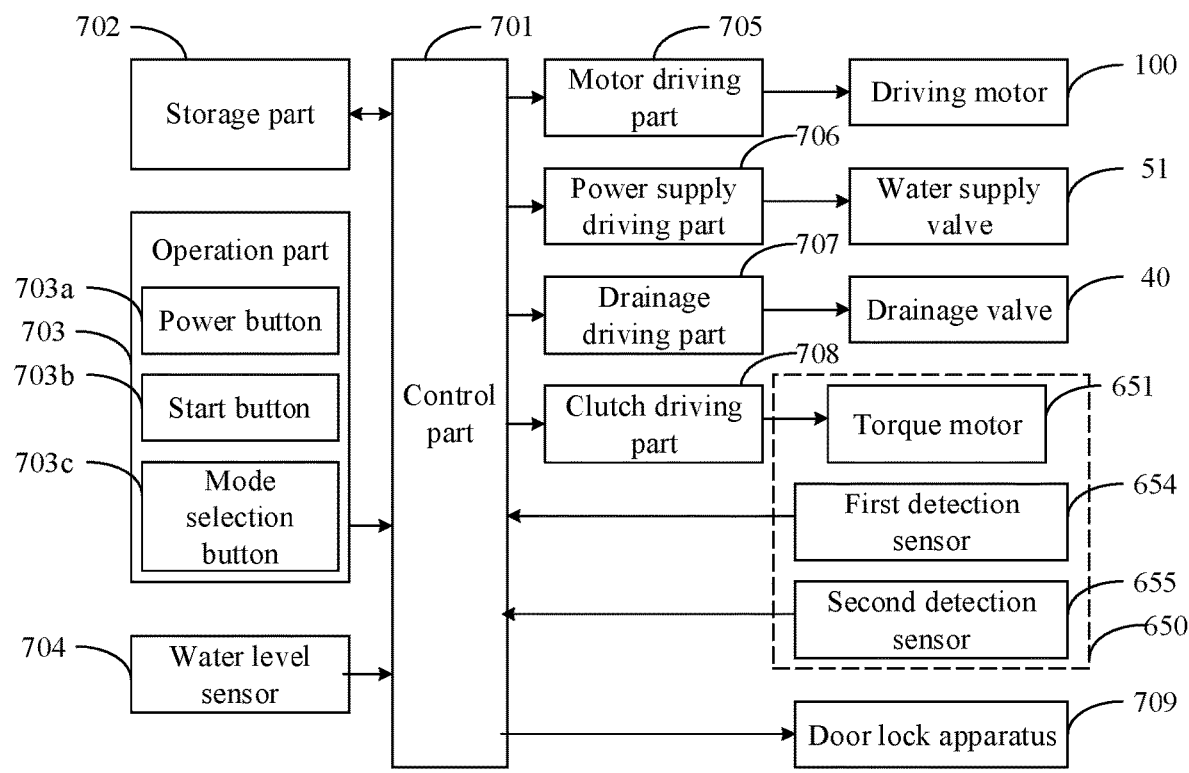
FIG. 10 is a block diagram illustrating a structure of a drum washing machine involved in an embodiment.

FIG. 10 is a block diagram illustrating a structure of a drum washing machine 1.

Besides the above structure, the drum washing machine 1 further includes: a control part 701, a storage part 702, an operation part 703, a water level sensor 704, a motor driving part 705, a water supply driving part 706, a drainage driving part 707, a clutch driving part 708 and a door lock apparatus 709.

The operation part 703 includes: a power button 703a, a start button 703b and a mode selection button 703c. The power button 703a is a button for turning on and off a power supply of the drum washing machine 1. The start button 703b is a button for starting the operation. The mode selection button 703c is a button for selecting any operation mode from a plurality of operation modes for the washing operation. The operation part 703 outputs an input signal corresponding to a button operated by a user to the control part 701.

The water level sensor 704 detects a water level in the outer drum 20, and outputs a water level detection signal corresponding to the detected water level to the control part 701.

The motor driving part 705 supplies a driving current to the driving motor 100 in accordance with a control signal from the control part 701. The motor driving part 705 includes a speed sensor for detecting the rotating speed of the driving motor 100, a frequency converter circuit and the like, and adjusts the driving current so that the driving motor 100 rotates at the rotating speed set by the control part 701. For example, PWM is used as motor driving control. In this case, the control part 701 applies a pulse voltage, which has a duty cycle determined based on the detected rotating speed, on the driving motor 100, so as to supply the driving current corresponding to the pulse voltage to the driving motor 100.

The water supply driving part 706 provides the driving current to the water supply valve 51 in accordance with the control signal from the control part 701. The drainage driving part 707 provides the driving current to the drainage valve 40 in accordance with the control signal from the control part 701.

The clutch driving apparatus 650 includes a first detection sensor 654 and a second detection sensor 655. The first detection sensor 654 detects that the driving form of the driving unit 30 is switched to the biaxial driving form, and outputs a detection signal to the control part 701. The second detection sensor 655 detects that the driving form of the driving unit 30 is switched to the uniaxial driving form, and outputs a detection signal to the control part 701. The clutch driving part 708 provides the driving current to the torque motor 651 based on the detection signals from the first detection sensor 654 and the second detection sensor 655 and according to the control signal outputted from the control part 701.

The door lock apparatus 709 locks and unlocks a door 12 in accordance with the control signal from the control part 701.

The storage part 702 includes an EEPROM, a RAM and the like. The storage part 702 stores procedures for executing the washing operation of various washing operation modes. In addition, the storage part 702 stores various parameters and various control marks for the execution of the procedures.

The control part 701 controls the motor driving part 705, the water supply driving part 706, the drainage driving part 707, the clutch driving part 708 and the door lock apparatus 709 according to the procedures stored in the storage part 702 based on the signals from the operation part 703 and the water level sensor 704.

The drum washing machine 1 performs the washing operation of various operation modes according to selection operation implemented by the user through the mode selection button 703c. The washing operation executes a washing process, an intermediate dewatering process, a rinsing process and a final dewatering process in sequence. It should be noted that the intermediate dewatering process and the rinsing process are sometimes performed more than two times according to the operation modes.

In the washing process and the rinsing process, the driving form of the driving unit 30 is switched to the biaxial driving form. Water is stored in the outer drum 20 to a position lower than a specified water level at a lower edge of a throwing inlet 11 in such a manner that washings in the drum 22 are immersed in the water. In this state, the driving motor 100 alternately performs forward rotation and backward rotation. Thus, the drum 22 and the agitator 24 alternately perform positive rotation and reverse rotation in such a state that the rotating speed of the agitator 24 is higher than the rotating speed of the drum 22. At this moment, the drum 22 rotates at such a rotating speed that a centrifugal force applied to the washings is smaller than the weight of the washings.

The washings in the drum 22 are lifted and dropped down through the baffles 23 and thrown to an inner circumferential surface of the drum 22. In addition, at the rear of the drum 22, the washings contact blades 24a of the rotating agitator 24, and the washings are rubbed by the blades 24a or agitated by the blades 24a. Thus, the washings are washed or rinsed.

During washing and rinsing like this, since not only a mechanical force generated by the rotation of the drum 22 is applied to the washings, but also a mechanical force generated by the agitator 24 is applied to the washings, improvement of washing performance can be expected. In the intermediate dewatering process and the final dewatering process, the driving form of the driving unit 30 is switched to the uniaxial driving form. The driving motor 100 (i.e., the drum 22 and the agitator 24) rotates integrally at a rotating speed through which centrifugal force applied on the washings in the drum 22 is higher than the weight of the washings. The washings are pressed on the inner circumferential surface of the drum 22 through the effect of the centrifugal force and are dewatered.

In this way, during dewatering, since the drum 22 and the agitator 24 rotate integrally, the washings can be well dewatered without the need to agitate the washings attached to the drum 22.

In the drum washing machine 1 in the present embodiment, at the end of washing and rinsing, after the control part 701 stops the driving motor 100 and stops the drum 22, the driving form of the driving unit 30 is switched from the biaxial driving form to the uniaxial driving form. In addition, at the end of the intermediate dewatering, after the control part 701 stops the driving motor 100 and stops the drum 22, the driving form of the driving unit 30 is switched from the uniaxial driving form to the biaxial driving form.

Figure 11A:
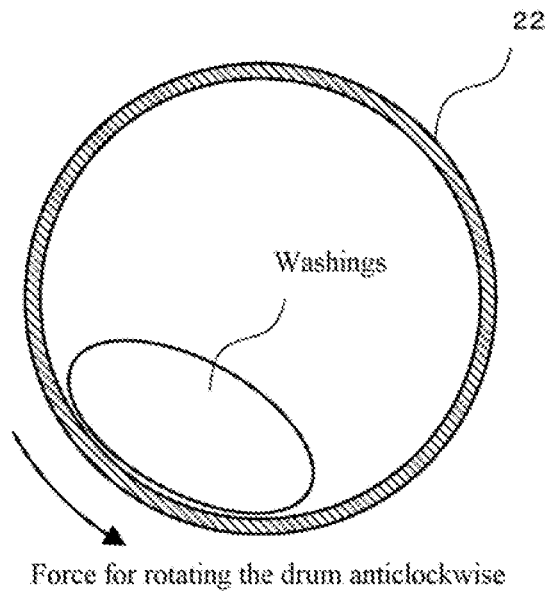
FIG. 11(a) is a schematic diagram illustrating a condition that washings in a drum are biased to a left side when observed from the front side involved in an embodiment.
Figure 11B:
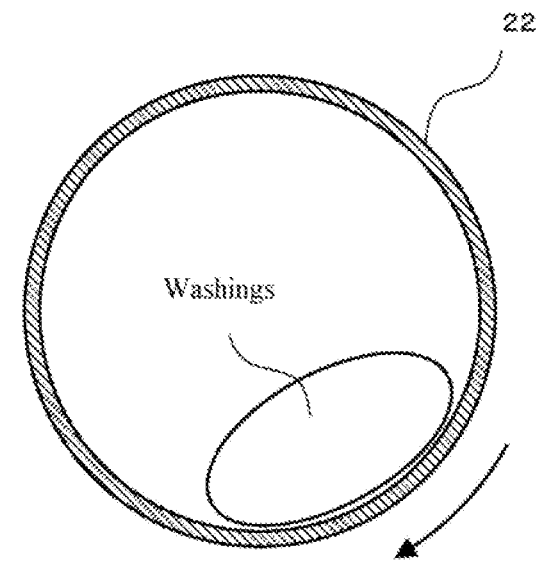
FIG. 11(b) is a schematic diagram illustrating a condition that washings in a drum are biased to a right side when observed from the front side involved in an embodiment.

FIG. 11(a) is a schematic diagram illustrating a condition that washings in a drum 22 are biased to a left side when observed from the front side; FIG. 11(b) is a schematic diagram illustrating a condition that washings in a drum are biased to a right side when observed from the front side.

Under a condition that the drum 22 is stopped, as shown in FIG. 11(a), when the washings in the drum 22 are biased to the left side, the washings applies a force that enables the drum 22 to rotate anticlockwise. In another aspect, as shown in FIG. 11(b), when the washings in the drum 22 are biased to the right side, the washing applies a force that enables the drum 22 to rotate clockwise.

In this way, under a condition that the washings in the drum 22 are biased to the left side or the right side, when the driving form is the biaxial driving form, the teeth 611a of the spline 611 of the clutch body 610 engage with the teeth 534a of the spline 534 of the clutch carrying plate 530 in a state of being pressed towards one side by a force; and frictional resistance between pressed surfaces of the teeth 611a and 534a is increased. In this way, even if pushing on the clutch body 610 by the clutch lever 630 is relieved and the clutch body 610 is pushed to the rotor 110 side through the clutch spring 620 in order to switch from the biaxial driving form to the uniaxial driving form, the teeth 611a and 534a of the spline 611 and the spline 534 are difficult to disengage with each other. Therefore, it is possible that switching may not be conducted smoothly from the biaxial driving form to the uniaxial driving form.

Similarly, under a condition that the washings in the drum 22 are biased to the left side or the right side, when the driving form is the uniaxial driving form, the engaging bulge 613b of the engaging part 613 of the clutch body 610 engages with the engaging recess 132b of the engaged part 132 of the clutch carrying part 130 in a state of being pressed to one side by a force; and frictional resistance between pressed surfaces of the engaging bulge 613b and the engaging recess 132b is increased. In this way, even if the clutch body 610 is pushed to the bearing unit 500 side through the clutch lever 630 in order to switch from the uniaxial driving form to the biaxial driving form, the engaging bulge 613b and the engaging recess 132b are difficult to disengage with each other. Therefore, it is possible that switching may not be conducted smoothly from the uniaxial driving form to the biaxial driving form.

Therefore, in the present embodiment, the driving control over the clutch driving apparatus 650 and the driving motor for smoothly switching the driving form of the driving unit 30 is executed by the control part 701.

Figure 12:
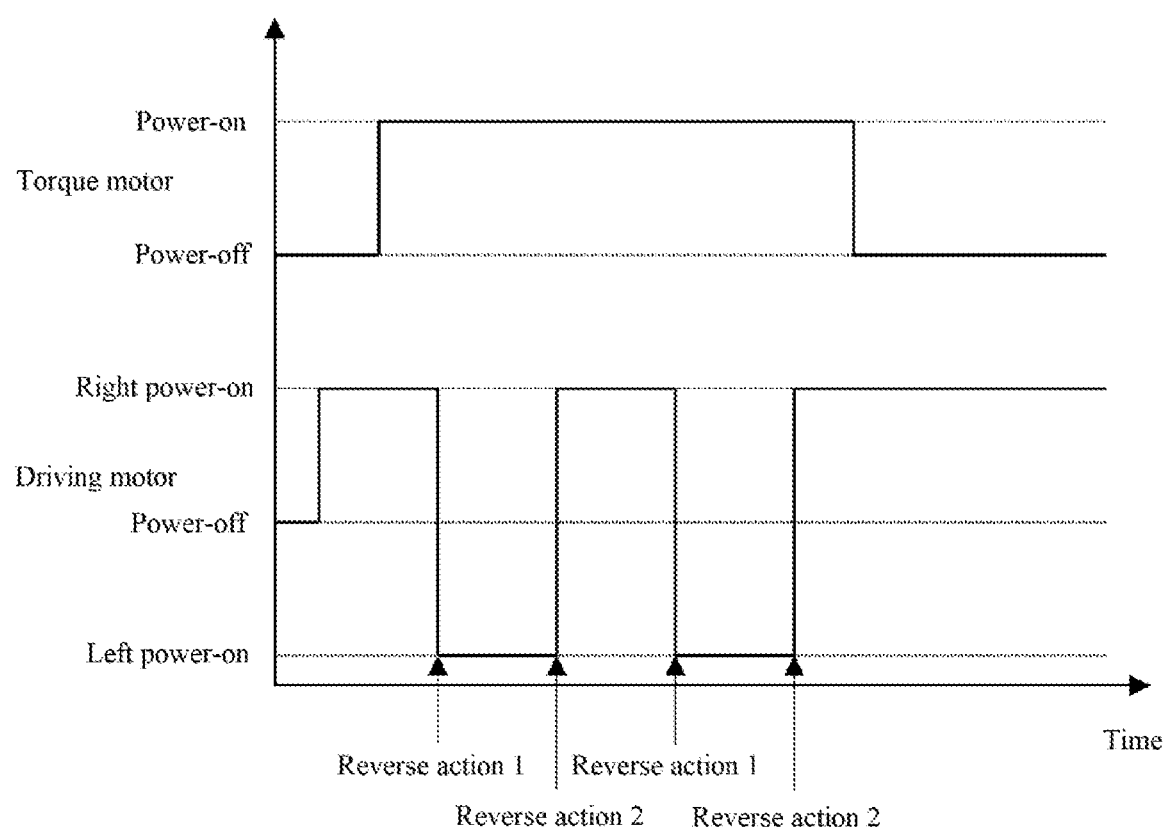
FIG. 12 is a timing diagram illustrating power-on actions of a torque motor and a driving motor of a clutch driving apparatus while switching a driving form of a driving unit involved in an embodiment.

FIG. 12 is a timing diagram illustrating power-on actions of a torque motor 651 and a driving motor 100 of a clutch driving apparatus 650 while switching a driving form of a driving unit 30.

For both parts subjected to switching from the uniaxial driving form to the biaxial driving form and switching from the biaxial driving form to the uniaxial driving form, as shown in FIG. 12, after the control part 701 energizes the driving motor 100 in a right rotation manner and rotates the rotor 110 clockwise, the driving motor 100 is deenergized. Then, after the control part 701 immediately energizes the driving motor 100 in a left rotation manner without interposing a deenergizing period and rotates the rotor 110 anticlockwise, the driving motor 100 is deenergized. Then, further, after the control part 701 immediately energizes the driving motor 100 in a right rotation manner without interposing a deenergizing period and rotates the rotor 110 clockwise, the driving motor 100 is deenergized. Then, after the control part 701 immediately energizes the driving motor 100 in a left rotation manner without interposing a deenergizing period and rotates the rotor 110 anticlockwise, the driving motor 100 is deenergized. Finally, the control part 701 immediately energizes the driving motor 100 in a right rotation manner without interposing a deenergizing period. Then, in order to conduct washing, rinsing, dewatering and the like after the driving form is switched, the driving motor 100 is continuously energized and the rotor 110 continuously rotates.

During energizing-deenergizing actions of the driving motor 100, the control part 701 enables the torque motor 651 to operate. Namely, as shown in FIG. 12, after the control part 701 initially energizes the driving motor 100 in the right rotation manner, the torque motor 651 is energized until the driving motor 100 is deenergized. Then, the control part 701 deenergizes the torque motor 651 according to the detection of the first detection sensor 654 when switching from the uniaxial driving form to the biaxial driving form, and deenergizes the torque motor 651 according to the detection of the first detection sensor 654 when switching from the biaxial driving form to the uniaxial driving form. However, in either case, the torque motor 651 is deenergized after the driving motor 100 is finally energized in the right rotation manner.

The driving motor 100 and the torque motor 651 operate through such timing, so that a reverse action 1 and a reverse action 2 are respectively repeated twice during the operation of the torque motor 651 (i.e., during a movement action of the clutch body 610 performed through the moving mechanism DM). The reverse action 1 is an action of stopping the rotor 110 rotating clockwise and then immediately rotating the rotor 110 anticlockwise. The reverse action 2 is an action of stopping the rotor 110 rotating anticlockwise and then immediately rotating the rotor 110 clockwise.

As shown in FIG. 11(a), under a condition that the washings in the drum 22 are biased to the left side when the drum 22 is stopped, if the rotor 110 of the driving motor 100 rotates clockwise, the drum 22 rotates in a clockwise direction opposite to the direction of the force applied by the biased washings. Then, when the driving motor 100 is stopped, since an inertia force for continuing to rotate clockwise is applied on the drum 22 at this moment, the force applied by the biased washings is offset by the inertia force and is decreased. In this way, under a condition of switching from the biaxial driving form to the uniaxial driving form, since a force for pressing the teeth 611a of the spline 611 of the clutch body 610 and the teeth 534a of the spline 534 of the clutch carrying plate 530 towards one side is decreased, the teeth 611a of the spline 611 can easily disengage from the teeth 534a of the spline 534. In addition, under a condition of switching from the uniaxial driving form to the biaxial driving form, since a force for pressing the engaging bulge 613b of the engaging part 613 of the clutch body 610 and the engaging recess 132b of the engaged part 132 of the clutch carrying part 130 is decreased, the engaging bulge 613b of the engaging part 613 can easily disengage from the engaging recess 132b of the engaged part 132.

In addition, the rotor 110 of the driving motor 100 rotates anticlockwise immediately after stopping, and then the spline 611 and the engaged part 132 rotate towards the direction of decreasing the force used to press the teeth 611a and the teeth 534a as well as the engaging bulge 613b and the engaging recess 132b towards one side. Therefore, the disengagement between the spline 611 and the spline 534 and the disengagement between the engaging part 613 and the engaged part 132 are more difficult.

In this way, even if the washings in the drum 22 are biased to the left side when the drum 22 is stopped, the reverse action 1 is made twice during the operation of the torque motor 651, so that the disengagement between the spline 611 and the spline 534 and the disengagement between the engaging part 613 and the engaged part 132 are also easy. Similarly, as shown in FIG. 11(b), even if the washings in the drum 22 are biased to the right side when the drum 22 is stopped, the reverse action 2 is made twice during the operation of the torque motor 651 and a phenomenon identical with the case where the reverse action 1 is made twice, so that the disengagement between the spline 611 and the spline 534 and the disengagement between the engaging part 613 and the engaged part 132 are also easy. Thus, switching from the biaxial driving form to the uniaxial driving form can be conducted smoothly, and switching from the uniaxial driving form to the biaxial driving form can be conducted smoothly.

As mentioned above, according to the present embodiment, even if the clutch body 610 moves to the clutch carrying plate 530 side in order to switch to the biaxial driving form, the teeth 611a of the spline 611 and the teeth 534a of the spline 534 do not engage with each other but collide. Then, the teeth 611a and 534a are staggered through the rotation of the driving motor 100 and the clutch body 610 moves fast to the clutch carrying plate 530 side, so that the teeth 611a engage with the teeth 534a. At this moment, since the bearing-side buffer member 540 arranged on the clutch carrying plate 530 side firstly contacts the front end part of the clutch body 610, the impact force to the clutch carrying plate 530 side of the clutch body 610 is also decreased by the bearing-side buffer member 540. Thus, an impact sound generated between the clutch body 610 side and the clutch carrying plate 530 side is reduced.

In addition, according to the present embodiment, the bearing-side buffer member 540 is clamped by the bearing part 510 and the clutch carrying plate 530 through the flange 541 and is fixed to the clutch carrying plate 530 side. Therefore, the bearing-side buffer member 540 can be easily fixed to the clutch carrying plate 530 side without using a screw and the like.

Further, according to the present embodiment, even if the clutch body 610 moves to the clutch carrying part 130 side in order to switch to the uniaxial driving form, the engaging bulge 613b does not engage with the engaging recess 132b while the engaging bulge 613b collides with the surface 132a of the engaged part 132. Then, the rotation of the driving motor 100 makes that the position of the engaging bulge 613b is consistent with the position of the engaging recess 132b. The clutch body 610 moves fast to the clutch carrying part 130 side while the engaging bulge 613b engages with the engaging recess 132b. At this moment, since the rotor-side buffer member 680 configured on the clutch body 610 side firstly contacts the contact surface 133 of the clutch carrying part 130 side, the impact force to the clutch carrying part 130 side of the clutch body 610 is also weakened by the rotor-side buffer member 680. Thus, an impact sound generated between the clutch body 610 side and the clutch carrying part 130 side is reduced.

Further, according to the present embodiment, the claws 681 of the rotor-side buffer member 680 are clamped in the holes 614 formed in the clutch body 610 so that the rotor-side buffer member 680 is fixed to the clutch body 610 side. Therefore, the rotor-side buffer member 680 can be easily fixed to the clutch body 610 side without using a screw and the like.

Further, according to the present embodiment, during switching from the uniaxial driving form to the biaxial driving form and switching from the biaxial driving form to the uniaxial driving form, the rotor 110 of the driving motor 100 rotates clockwise and anticlockwise respectively, so as to execute an action of stopping the rotor 110 rotating clockwise, as well as an action of stopping the rotor 110 rotating anticlockwise, when the clutch body 610 moves by means of the moving mechanism DM. Thus, even if the washings in the drum 22 are biased to the left side or the right side when the drum 22 is stopped, under a condition of switching from the uniaxial driving form to the biaxial driving form, the engaging part 613 of the clutch body 610 can easily disengage from the engaged part 132 of the clutch carrying part 130; while under a condition of switching from the biaxial driving form to the uniaxial driving form, the spline 611 of the clutch body 610 can easily disengage from the spline 534 of the clutch carrying plate 530. Therefore, according to the present embodiment, the switching of the driving form between the uniaxial driving form and the biaxial driving form can be conducted smoothly.

In addition, under a condition that the torque motor 651 operates in a state of being difficult to disengage, a load applied to the torque motor 651 may be increased. According to the present embodiment, the load applied to the torque motor 651 can be prevented from being increased.

Further, under a condition of switching from the uniaxial driving form to the biaxial driving form, since the clutch lever 630 does not move when the engaging part 613 has not disengaged from the engaged part 132, only the spring 661 of the relay rod 660 is in an elongated state and the operation of the torque motor 651 is finished. After that, when the driving motor 100 rotates to wash the washings, since the force used to press the engaging bulge 613b and the engaging recess 132b towards one side is weakened, the disengagement between the engaging bulge 613b and the engaging recess 132b is easy. In this way, the following hidden risks exist: the spring 661 rapidly contracts while the clutch lever 630 moves fast; the clutch body 610 is quickly pushed by the clutch lever 630 and fiercely collides with the clutch carrying plate 530, thereby generating large impact sound. In addition, under a condition of switching from the biaxial driving form to the uniaxial driving form, when the spline 611 does not disengage from the spline 534, only the clutch lever 630 moves through the action of the torque motor 651 in a state that the clutch spring 620 contracts. After that, if the operation of the torque motor 651 is finished, when the disengagement is easy because the driving motor 100 rotates in order to wash the washings, the following hidden risks exist: the clutch spring 620 is rapidly elongated; the clutch body 610 is quickly pushed by the clutch spring 620 and fiercely collides with the clutch carrying part 130, thereby generating large impact sound. According to the present embodiment, since the spline 611 and the spline 534, and the engaging part 613 can disengage from the engaged part 132 smoothly, large impact sound can be avoided between the clutch body 610 and the clutch carrying plate 530 and between the clutch body 610 and the clutch carrying part 130.

Further, according to the present embodiment, since the rotor 110 rotates along an opposite direction without interposing a stopping period immediately after the rotor 110 of the driving motor 100 stops from a state of rotating along one direction, the force used to press the teeth 611a of the spline 611 and the teeth 534a of the spline 534, as well as the engaging bulge 613b of the engaging part 613 and the engaging recess 132b of the engaged part 132, towards one side can be further weakened. The disengagement between the spline 611 and the spline 534 and the disengagement between the engaging part 613 and the engaged part 132 become easier.

Further, according to the present embodiment, since the torque motor 651 starts to operate (i.e., the moving action of the clutch body 610 of the moving mechanism DM is started) after the rotor 110 of the driving motor 100 initially starts to rotate clockwise, an action of stopping the rotor 110 rotating clockwise is conducted immediately after the moving action of the clutch body 610 is started. Therefore, the disengagement between the spline 611 and the spline 534 and the disengagement between the engaging part 613 and the engaged part 132 become easier.

Although embodiments of the present disclosure are described above, the present disclosure is not limited to the above-mentioned embodiments. In addition, various changes except for the above can also be made to embodiments of the present disclosure.

For example, in above embodiments, in order to reduce the impact sound between the clutch body 610 side and the clutch carrying plate 530 side, the bearing-side buffer member 540 is arranged on the clutch carrying plate 530 side. However, as shown in FIG. 11 and FIG. 12, a bearing-side buffer member 690 may also be arranged on the clutch body 610 side to replace the bearing-side buffer member 540.

Figure 13:
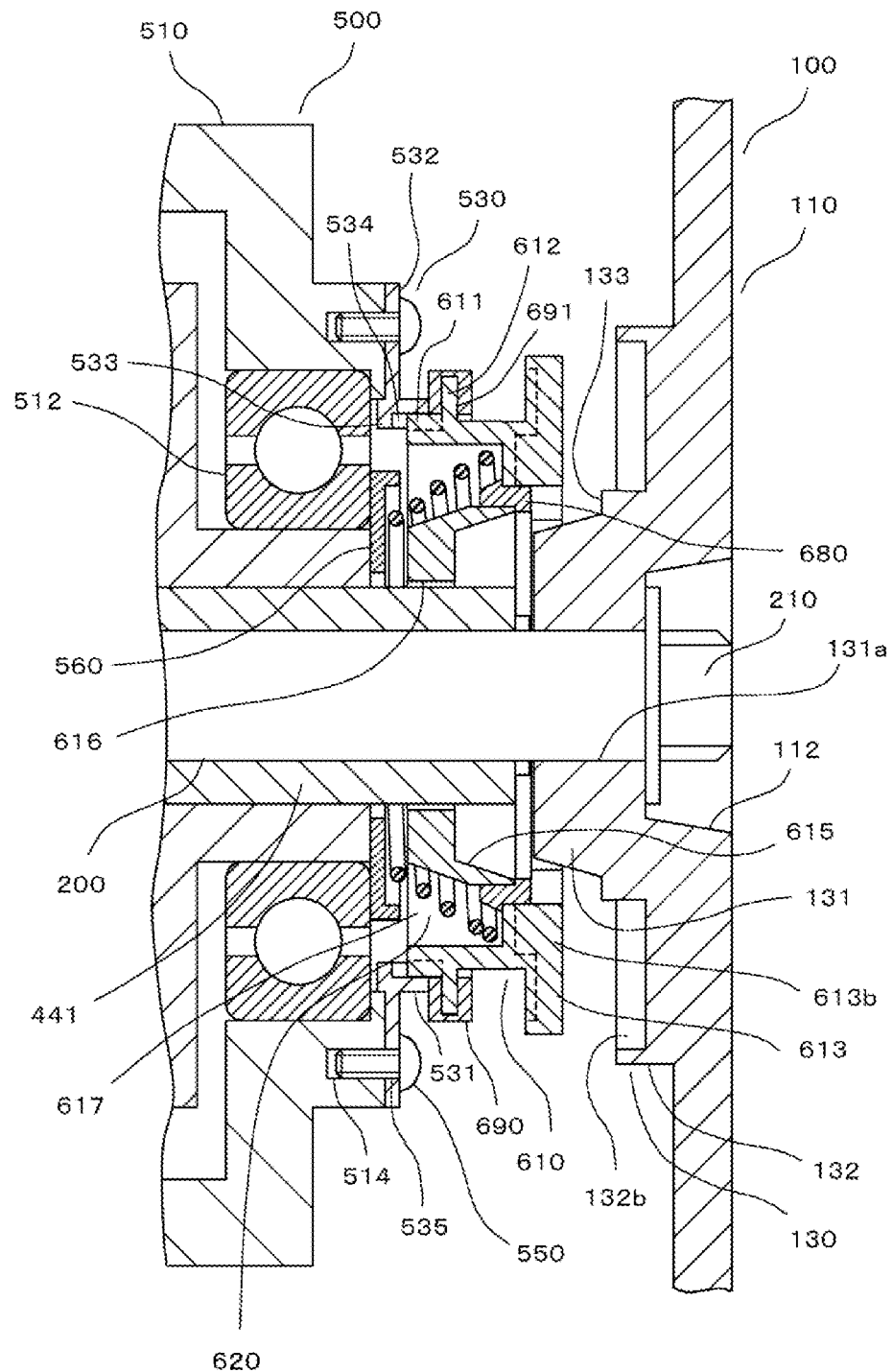
FIG. 13 is a sectional view illustrating a main part in an enlarged view of a periphery of a clutch body involved in an alternative embodiment.
Figure 14A:
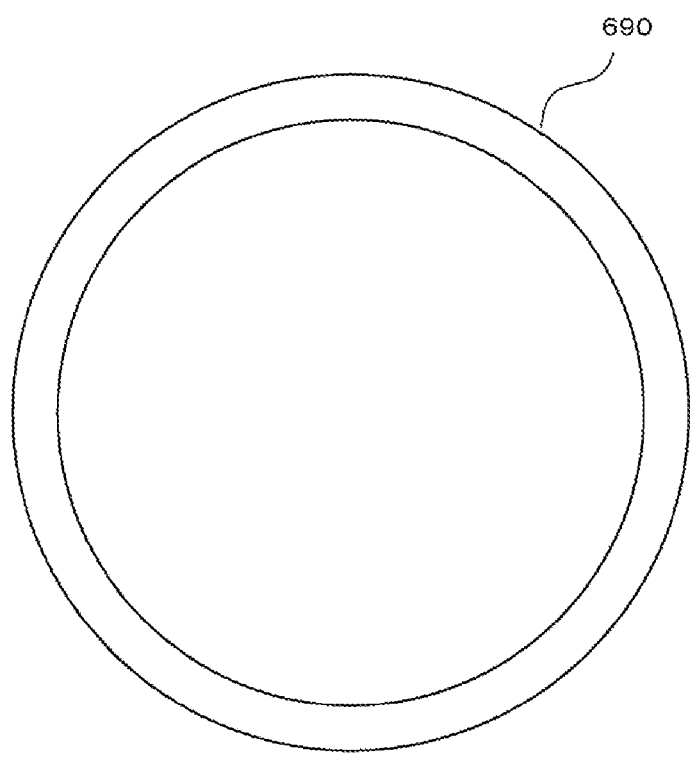
FIGS. 14(a) and (b) are respectively a front view and a side sectional view illustrating a bearing-side buffer member involved in an alternative embodiment.
Figure 14B:
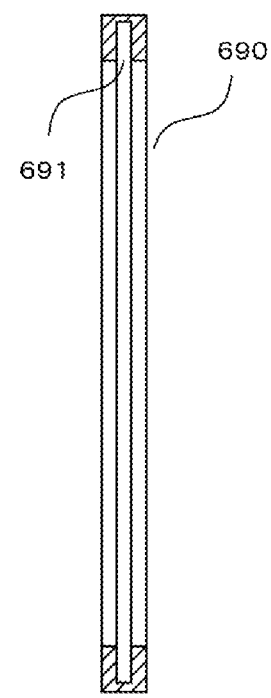

FIG. 13 is a sectional view illustrating a main part in an enlarged view of a periphery of a clutch body 610 involved in an alternative embodiment. FIGS. 14(a) and (b) are respectively a front view and a side sectional view illustrating a bearing-side buffer member 690 involved in an alternative embodiment.

The bearing-side buffer member 690 is formed into a circular shape by rubber and other elastic members. In the bearing-side buffer member 690, an annular groove part 691 is formed in the center. The bearing-side buffer member 690 is embedded into the flange 612 of the clutch body 610 through the groove part 691 and is fixed to the clutch body 610.

As shown in FIG. 13, when the spline 611 of the clutch body 610 engages with the spline 534 of the clutch carrying plate 530, the bearing-side buffer member 690 firstly contacts with the clutch carrying plate 530. Thus, the impact sound between the clutch body 610 side and the clutch carrying plate 530 side can be reduced.

In addition, in above embodiments, in order to reduce the impact sound between the clutch body 610 side and the clutch carrying part 130 side, the rotor-side buffer member 680 is arranged on the clutch body 610 side. However, as shown in FIG. 15, a rotor-side buffer member 140 may also be arranged on the clutch carrying part 130 side to replace the rotor-side buffer member 680.

Figure 15:
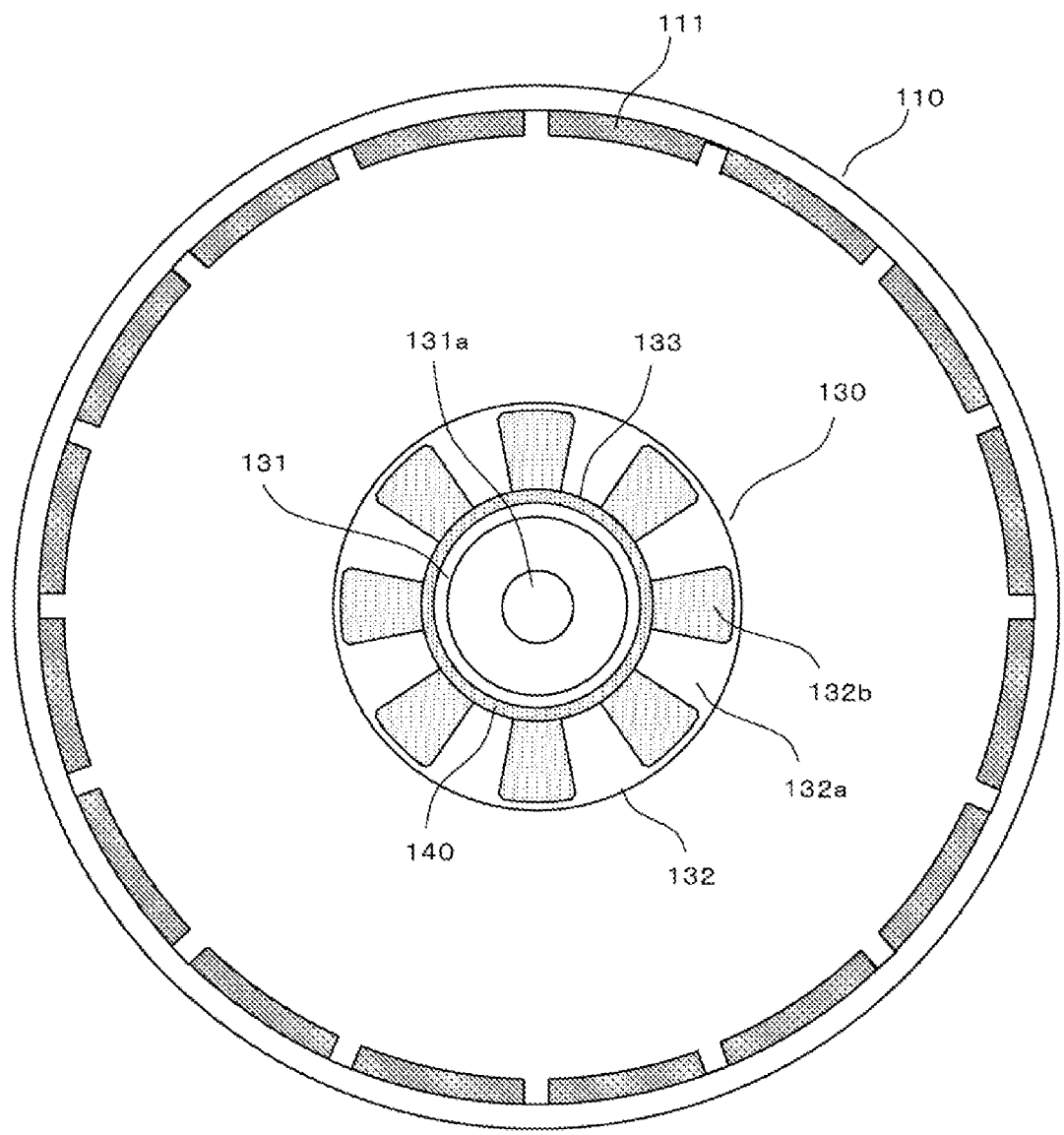
FIG. 15 is a front view illustrating a rotor of a driving motor involved in an alternative embodiment.

FIG. 15 is a front view illustrating a rotor 110 of a driving motor 100 involved in an alternative embodiment. The rotor-side buffer member 140 is formed into an annular shape by an elastic member such as rubber, and is fixed by attaching to the contact surface 133 of the clutch carrying part 130 side or other fixation methods. When the engaging part 613 of the clutch body 610 engages with the engaged part 132 of the clutch carrying part 130, the rotor-side buffer member 140 firstly contacts with the clutch body 610. Thus, the impact sound between the clutch body 610 side and the clutch carrying part 130 side can be reduced.

Figure 16:
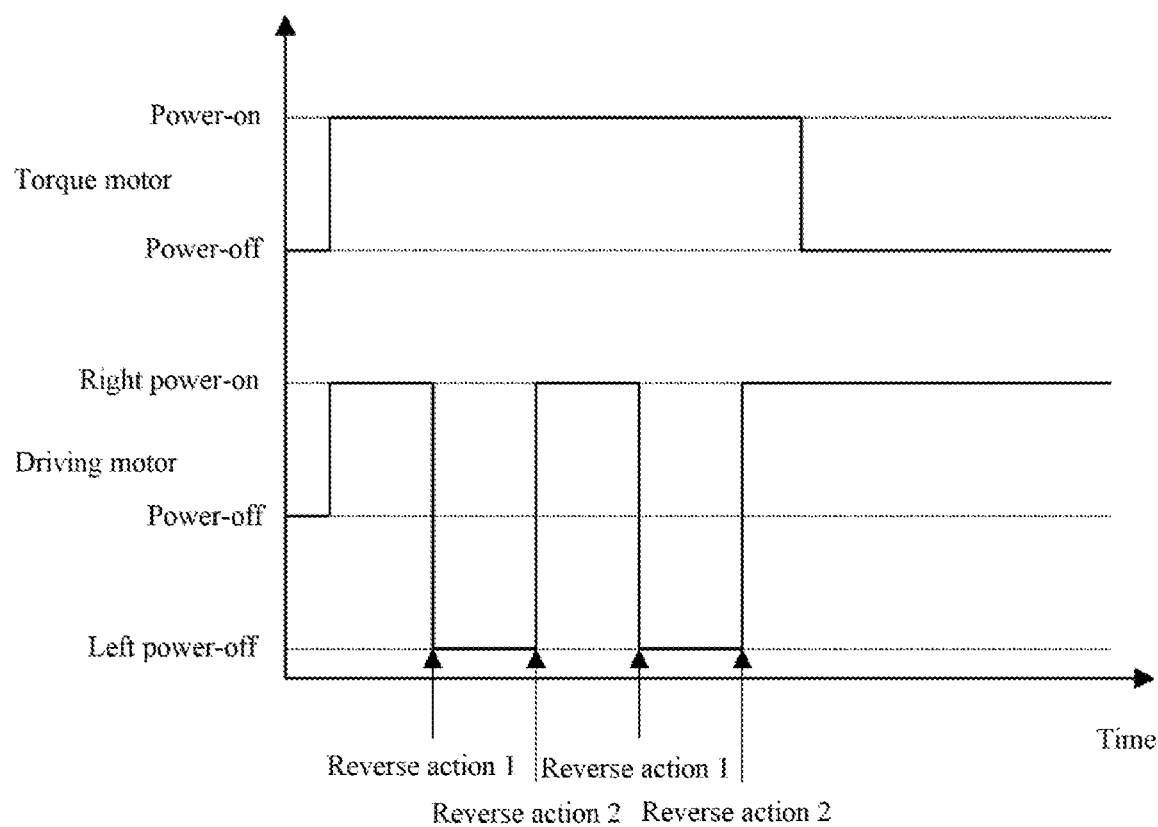
FIG. 16 is a timing diagram illustrating power-on actions of a torque motor and a driving motor of a clutch driving apparatus while switching a driving form of a driving unit involved in an alternative embodiment.

Further, in above embodiments, as shown in FIG. 12, after the control part 701 initially energizes the driving motor 100 in the right rotation manner, the torque motor 651 is energized until the driving motor 100 is deenergized. Namely, after the rotor 110 of the driving motor 100 initially starts to rotate clockwise, the moving action of the clutch body 610 of the moving mechanism DM is started. However, as shown in the timing diagram of FIG. 16, the control part 701 may also energize the torque motor 651 almost at the same time of energizing the driving motor 100 in the right rotation manner initially. Namely, the moving action of the clutch body 610 may be started through the moving mechanism DM almost at the same time that the rotor 110 of the driving motor 100 initially starts to rotate clockwise.

Further, in above embodiments, after the rotor 110 of the driving motor 100 stops from the state of rotating along one direction, the rotor 110 immediately rotates along an opposite direction without interposing a stopping period. However, the rotor 110 may also stop and then rotate along the opposite direction after the rotor 110 of the driving motor 100 stops from the state of rotating along one direction.

Further, in above embodiments, although the rotor 110 of the driving motor 100 initially rotates clockwise, the rotor 110 may also initially rotate anticlockwise.

Figure 17:
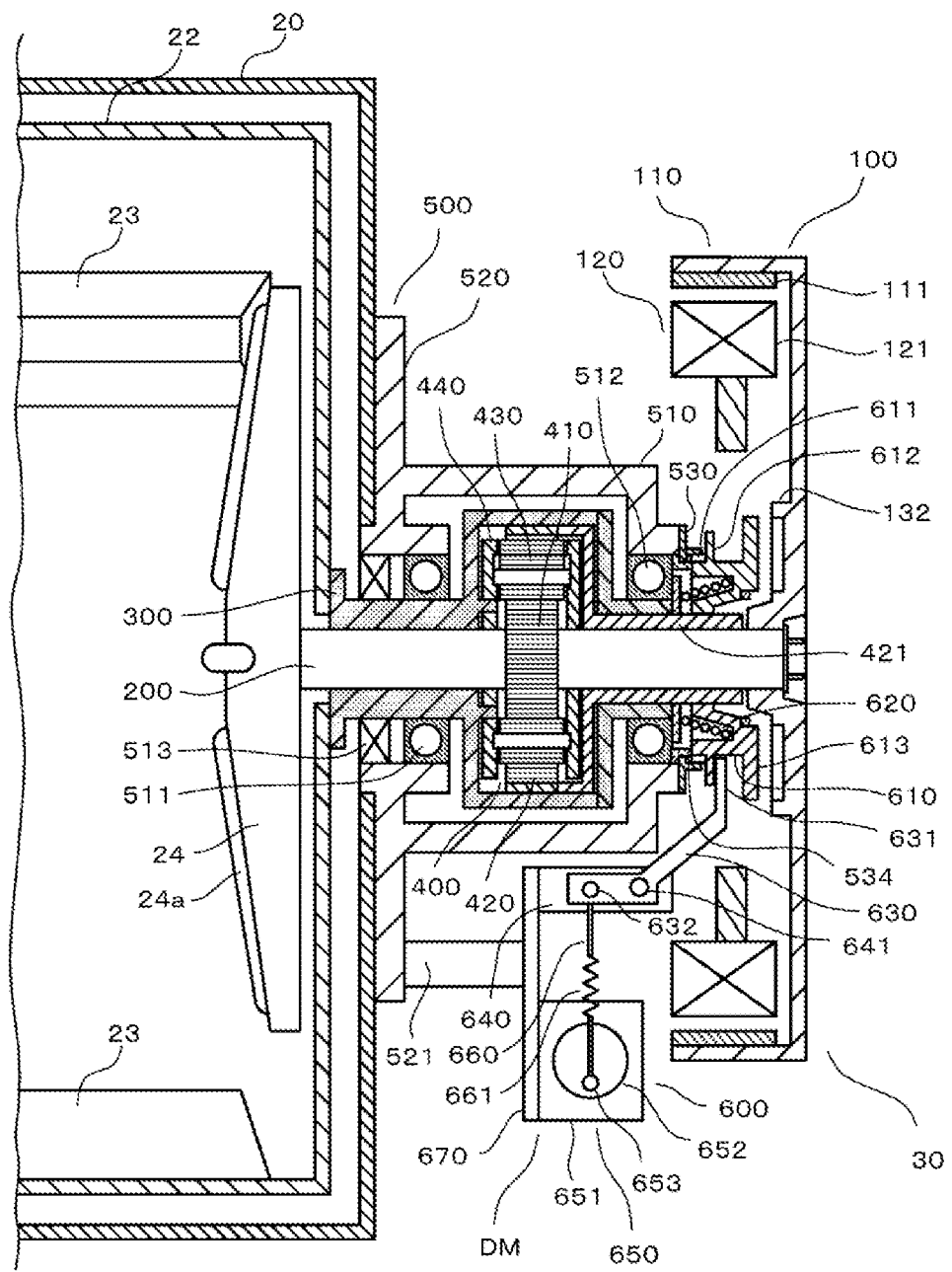
FIG. 17 is a sectional view illustrating a structure of a driving unit involved in an alternative embodiment.

Further, in above embodiments, the drum shaft 300 is fixed to the inner gear 420, and the clutch body 610 is connected with the planet carrier shaft 441 (i.e., the planet carrier 440). Thus, in the biaxial driving form, when the wing shaft 200 rotates in such a state that the planet carrier 440 is fixed by the clutch body 610, the planet gear 430 rotates along with the rotation of the sun gear 410 and the inner gear 420 rotates at a rotating speed lower than the rotating speed of the sun gear 410. However, as shown in FIG. 17, a structure in which the drum shaft 300 is fixed to the planet carrier 440 may also be adopted. In this case, a shaft part 421 with a top end part protruding from the drum shaft 300 to a rear side is installed on the inner gear 420. Moreover, the clutch body 610 is connected with the shaft part 421. Namely, the clutch body 610 is connected with the inner gear 420 via the shaft part 421. Further, the planet gear 430 is changed to have only a first gear. In the biaxial driving form, when the wing shaft 200 rotates in such a state that the inner carrier 420 is fixed by the clutch body 610, the planet gear 430 rotates and revolves along with the rotation of the sun gear 410 and the planet carrier 440 rotates at a rotating speed lower than the rotating speed of the sun gear 410. Thus, the drum shaft 300 fixed to the planet carrier 440 rotates.

Further, in above embodiments, the rotor 110 of the driving motor 100 is directly combined with the agitator 24 through the wing shaft 200; and the agitator 24 rotates at a rotating speed equal to the rotating speed of the driving motor 100. However, a speed reducing mechanism that uses the gear may also be clamped between the agitator 24 and the driving motor 100, which is the same as the case of the drum 222. In this case, the agitator 24 may rotate more rapidly than the drum 22 by that a speed reducing ratio of the speed reducing mechanism for the agitator 24 is smaller than a speed reducing ratio of the planetary gear mechanism 400.

Further, in above embodiments, the drum 22 rotates about an inclination axis inclined relative to a horizontal direction. However, the drum washing machine 1 may also adopt a structure in which the drum 22 rotates about a horizontal axis.

Further, although the drum washing machine 1 in above embodiments does not have a drying function, the present disclosure can also be used for a drum washing machine having the drying function, i.e., a drum washing and drying machine.

In addition, various changes can be properly made to embodiments of the present disclosure within a scope of the technical idea shown in the technical solution.

LIST OF REFERENCE NUMERALS

10: housing;
20: outer drum;
22: drum;
24: agitator (rotating body);
24a: blade (protruding part);
30: driving unit (driving part);
100: driving motor;
110: rotor;
130: clutch carrying part;
132: engaged part (second engaged part);
200: wing shaft (first rotating shaft);
300: drum shaft (second rotating shaft);
400: planetary gear mechanism;
410: sun gear;
420: inner gear;
430: planet gear;
440: planet carrier;
530: clutch carrying plate (fixing part);
534: spline (first engaged part);
600: clutch mechanism;
610: clutch body;
611: spline (first engaging part);
613: engaging part (second engaging part);
651: torque motor (power source);
701: control part; and
DM: moving mechanism.

What is claimed is:
1. A drum washing machine, comprising:
an outer drum, which is accommodated in a housing;
a drum, which is accommodated in the outer drum and is capable of rotating about a horizontal axis or an inclination axis inclined relative to a horizontal direction;
a rotating body, which is arranged in the rear of the drum and is provided with a protruding part on a surface of the rotating body and in contact with washings;
a driving part, which is used to rotate the drum and the rotating body; and
a control part, which is used to control an action of the driving part,
wherein the driving part comprises:
a driving motor, which comprises a rotor and a stator;
a first rotating shaft, which is used to transfer rotation of the rotor to the rotating body;

a second rotating shaft, which is coaxially arranged with the first rotating shaft and is used to transfer the rotation of the rotor to the drum;

a planetary gear mechanism, which comprises a sun gear, an internal gear, a plurality of planet gears and a planet carrier, wherein the sun gear is configured to rotate along with the rotation of the rotor, the internal gear is annular and surrounds the sun gear, the planet gears are arranged between the sun gear and the internal gear, the planet carrier is capable of freely and rotationally holding the planet gears, one of the planet carrier and the internal gear is fixed to the second rotating shaft; and a clutch mechanism, which is used to switch a driving form based on the driving part between a first form and a second form, wherein the first form is a driving form rotating the first rotating shaft and the second rotating shaft independently, and the second form is a driving form rotating the first rotating shaft and the second rotating shaft integrally, wherein the clutch mechanism comprises:

a clutch body, which is connected to the other one of the planet carrier and the internal gear not fixed to the second rotating shaft in such a way that the clutch body is capable of rotating together with the other one of the planet carrier and the internal gear and moving towards an axis direction of the second rotating shaft; and a moving mechanism, which is used to move the clutch body to move to a first position during switching to the first form and to move the clutch body to a second position during switching to the second form, wherein a first engaging part with a concave-convex shape and a second engaging part with a concave-convex shape are formed in the clutch body, a first engaged part is formed in a fixing part which does not rotate along with the rotor, the first engaged part has a concave-convex shape corresponding to the concave-convex shape of the first engaging part and engages with the first engaging part along a circumferential direction when the clutch body moves to the first position, a second engaged part is formed in a rotating part which rotates along with the rotor, the second engaged part has a concave-convex shape corresponding to the concave-convex shape of the second engaging part and engages with the second engaging part along the circumferential direction when the clutch body moves to the second position, wherein when switching from the first form to the second form, the control part is configured to alternatively rotate the rotor anticlockwise and clockwise in a manner of taking a first action and a second action during an action of moving the clutch body to the second position by virtue of the moving mechanism, wherein the first action is an action of stopping the rotor rotating clockwise and then immediately rotating the rotor anticlockwise, and the second action is an action of stopping the rotor rotating anticlockwise and then immediately rotating the rotor clockwise, the moving mechanism comprises a power source for moving the clutch body;

after the control part takes one of the first action and the second action, the control part is configured to take another one of the first action and the second action; and the control part is configured to start the power source operating in the course of rotating the rotor in order to take the one of the first action and the second action; and wherein after the first action, the control part is configured to rotate the rotor anticlockwise without interposing a stopping period;

after the second action, the control part is configured to rotate the rotor clockwise without interposing the stopping period.

2. The drum washing machine according to claim 1, wherein when switching from the second form to the first form, the control part is configured to alternatively rotate the rotor anticlockwise and clockwise in a manner of taking the first action and the second action during an action of moving the clutch body to the first position by virtue of the moving mechanism.

3. A drum washing machine, comprising:

an outer drum, which is accommodated in a housing;

a drum, which is accommodated in the outer drum and is capable of rotating about a horizontal axis or an inclination axis inclined relative to a horizontal direction;

a rotating body, which is arranged in the rear of the drum and is provided with a protruding part on a surface of the rotating body and in contact with washings;

a driving part, which is used to rotate the drum and the rotating body; and a control part, which is used to control an action of the driving part, wherein the driving part comprises:

a driving motor, which comprises a rotor and a stator;

a first rotating shaft, which is used to transfer rotation of the rotor to the rotating body;

a second rotating shaft, which is coaxially arranged with the first rotating shaft and is used to transfer the rotation of the rotor to the drum;

a planetary gear mechanism, which comprises a sun gear, an internal gear, a plurality of planet gears and a planet carrier, wherein the sun gear is configured to rotate along with the rotation of the rotor, the internal gear is annular and surrounds the sun gear, the planet gears are arranged between the sun gear and the internal gear, the planet carrier is capable of freely and rotationally holding the planet gears, one of the planet carrier and the internal gear is fixed to the second rotating shaft; and a clutch mechanism, which is used to switch a driving form based on the driving part between a first form and a second form, wherein the first form is a driving form rotating the first rotating shaft and the second rotating shaft independently, and the second form is a driving form rotating the first rotating shaft and the second rotating shaft integrally, wherein the clutch mechanism comprises:

a clutch body, which is connected to the other one of the planet carrier and the internal gear not fixed to the second rotating shaft in such a way that the clutch body is capable of rotating together with the other one of the planet carrier and the internal gear and moving towards an axis direction of the second rotating shaft; and a moving mechanism, which is used to move the clutch body to move to a first position during switching to the first form and to move the clutch body to a second position during switching to the second form, wherein a first engaging part with a concave-convex shape and a second engaging part with a concave-convex shape are formed in the clutch body, a first engaged part is formed in a fixing part which does not rotate along with the rotor, the first engaged part has a concave-convex shape corresponding to the concave-convex shape of the first engaging part and engages with the first engaging part along a circumferential direction when the clutch body moves to the first position, a second engaged part is formed in a rotating part which rotates along with the rotor, the second engaged part has a concave-convex shape corresponding to the concave-convex shape of the second engaging part and engages with the second engaging part along the circumferential direction when the clutch body moves to the second position, when switching from the second form to the first form, the control part is configured to rotate alternatively the rotor anticlockwise and clockwise in a manner of taking a first action and a second action during an action of moving the clutch body to the first position by virtue of the moving mechanism, wherein the first action is an action of stopping the rotor rotating clockwise and then immediately rotating the rotor anticlockwise, and the second action is an action of stopping the rotor rotating anticlockwise and then immediately rotating the rotor clockwise, the moving mechanism comprises a power source for moving the clutch body;

after the control part takes one of the first action and the second action, the control part takes another one of the first action and the second action; and the control part is configured to start the power source operating in the course of rotating the rotor in order to take the one of the first action and the second action; and wherein after the first action, the control part is configured to rotate the rotor anticlockwise without interposing a stopping period;

after the second action, the control part is configured to rotate the rotor clockwise without interposing the stopping period.

\* \* \* \* \*